(12) United States Patent
Dziedzic et al.

(10) Patent No.: US 12,636,987 B2
(45) Date of Patent: May 26, 2026

(54) LOW CHUCK COMPLIANT PIVOT JOINT

(71) Applicant: MAGNA SEATING INC, Aurora (CA)

(72) Inventors: Jerzy Dziedzic, Milford, MI (US); Kristof M Kurzeja, Commerce Township, MI (US)

(73) Assignee: MAGNA SEATING INC, Aurora (CA)

( * ) Notice: Subject to any disclaimer, the term of this patent is extended or adjusted under 35 U.S.C. 154(b) by 795 days.

(21) Appl. No.: 18/017,440

(22) PCT Filed: Jul. 22, 2021

(86) PCT No.: PCT/US2021/042740
§ 371 (c)(1),
(2) Date: Jun. 21, 2023

(87) PCT Pub. No.: WO2022/020568
PCT Pub. Date: Jan. 27, 2022

(65) Prior Publication Data
US 2024/0198877 A1    Jun. 20, 2024

Related U.S. Application Data

(60) Provisional application No. 63/054,819, filed on Jul. 22, 2020.

(51) Int. Cl.
B60N 2/68        (2006.01)
B60N 2/18        (2006.01)

(52) U.S. Cl.
CPC ........... B60N 2/682 (2013.01); B60N 2/1814 (2013.01)

(58) Field of Classification Search
CPC ..... F16B 35/041; B60N 2/682; B60N 2/1814; B60N 2205/20
See application file for complete search history.

(56) References Cited

U.S. PATENT DOCUMENTS

| | | | |
|---|---|---|---|
| 4,135,694 | A | 1/1979 | Stegenga et al. |
| 5,082,387 | A | 1/1992 | Devries |
| 9,010,854 | B2 | 4/2015 | Nonomiya et al. |
| 9,593,799 | B2 | 3/2017 | Wang et al. |

FOREIGN PATENT DOCUMENTS

| | | |
|---|---|---|
| FR | 604328 | 5/1926 |
| KR | 101885306 | 8/2018 |

*Primary Examiner* — Bradley Duckworth
(74) *Attorney, Agent, or Firm* — Miller Canfield

(57) ABSTRACT

A compliant pivot joint is provided for rotationally coupling a link member to a frame member in a vehicle seat. The compliant pivot joint includes a cup-shaped protrusion having a cup opening formed on the link member, a shoulder bolt having a first shaft portion projecting from a bolt head and terminating at a shoulder, a bias member having a bias opening, and a fastener fixedly coupled to the frame member. The shoulder bolt is fixedly coupled to the fastener and extends through the bias opening and through the cup opening. The bias member is spaced between the cup-shaped protrusion and the bolt head and biases the bolt head away from the cup-shaped protrusion. A curved shoulder surface of the fastener is frictionally engaged with the cup-shaped protrusion and the shoulder of the shoulder bolt is frictionally engaged with an end surface of the fastener.

17 Claims, 16 Drawing Sheets

LOW CHUCK COMPLIANT PIVOT JOINT

CROSS-REFERENCE TO RELATED APPLICATIONS

This application claims priority to and all the benefits of U.S. Provisional Application 63/054,819, filed Jul. 22, 2020, and entitled "Low Chuck Compliant Pivot Joint", the disclosure of which is hereby incorporated by reference in its entirety.

BACKGROUND OF THE INVENTION

1. Field of the Invention

The present invention relates to a pivot joint connecting two components of a vehicle seat. More specifically, the present invention relates to a low chuck compliant pivot joint rotationally coupling a pivot link to a frame member of a vehicle seat.

2. Description of Related Art

Many vehicle seats are repositionable between two or more positions. Often, the vehicle seat comprises a seat back rotatably coupled to a seat cushion frame with the seat cushion frame pivotably coupled to a seat base. In certain seats, the seat cushion frame is rotatably coupled to the seat base by one or more pivot links. Each pivot link is rotatably coupled by a first pivot joint to the seat cushion frame at one end and rotatably coupled by a second pivot joint to the seat base at an opposing end. Movement of the pivot links repositions the seat cushion frame between various positions.

Typically, the pivot joint includes an inherent amount of lateral clearance within the pivot joint to allow rotation of the pivot joint. In addition, radial loading can deform the pivot joint and cause wear overtime, which increases the perceived radial looseness. Further, lateral clearance is required for assembly and accommodation of tolerance stack up. In a typical pivot joint, such as a bushing pivot joint, the lateral clearance within the pivot joint results in overall perceived looseness related to the pivot joint.

At times, fore-aft and/or lateral loads are applied to the vehicle seat. The fore-aft and lateral loads can cause the pivot joints to chuck, or move abruptly, in response to the applied loads. Unfortunately, the chucking of the pivot joints can be perceived as looseness in the pivot joints, resulting in a perceived defect in the vehicle seat. In addition, the lateral clearances within the pivot joints can result in unacceptable buzz, squeak, and rattle (BSR) noises when the vehicle seat is subjected to road vibration. Both the perceived looseness in the pivot joints and observed buzz, squeak, and rattle noises can result in noise complaints.

It is desirable to limit the perceived looseness in the pivot joint of a vehicle seat in response to applied fore-aft and lateral loads. Further, it is desirable to maintain sufficient lateral clearance within the pivot joint to maintain rotational friction within a target range. In addition, it is desirable for the pivot joint to have a low amount of chuck in response to applied fore-aft and lateral loads. Also, it is desirable to reduce the potential for the occurrence of buzz, squeak, and rattle noises associated with the pivot joint.

SUMMARY OF THE INVENTION

The present invention relates to a compliant pivot joint for a vehicle seat that rotatably couples a link member to a frame member. The compliant pivot joint includes a cup-shaped protrusion having a cup opening and formed in one of the link member and the frame member, a fastener having a curved shoulder surface with the fastener fixedly coupled to the other one of the link member and the frame member, a shoulder bolt having a first shaft portion projecting from a bolt head with a shoulder extending from the first shaft portion and adjoining a second shaft portion, and a bias member having a bias opening. The shoulder bolt extends through the bias opening and through the cup opening with the shoulder bolt fixedly coupled to the fastener and the curved shoulder surface frictionally engaged with a lower surface of the cup-shaped protrusion. The bias member is spaced between an upper surface of the cup-shaped protrusion and the bolt head and biases the bolt head away from the cup-shaped protrusion.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

The present disclosure is directed to a pivot joint located within a vehicle seat. Specifically, the present disclosure is directed to a low chuck compliant pivot joint rotationally coupling a pivot link to a frame member of the vehicle seat and including a biasing member to minimize unwanted fore, aft, and lateral movements of the pivot link with respect to the frame member. FIGS. 1-5 and 8-19 illustrate exemplary low chuck compliant pivot joints rotationally coupling a pivot link to other components of a vehicle seat, according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Referring to the Figures, like numerals indicate like or corresponding parts throughout the several views.

Figure 1:
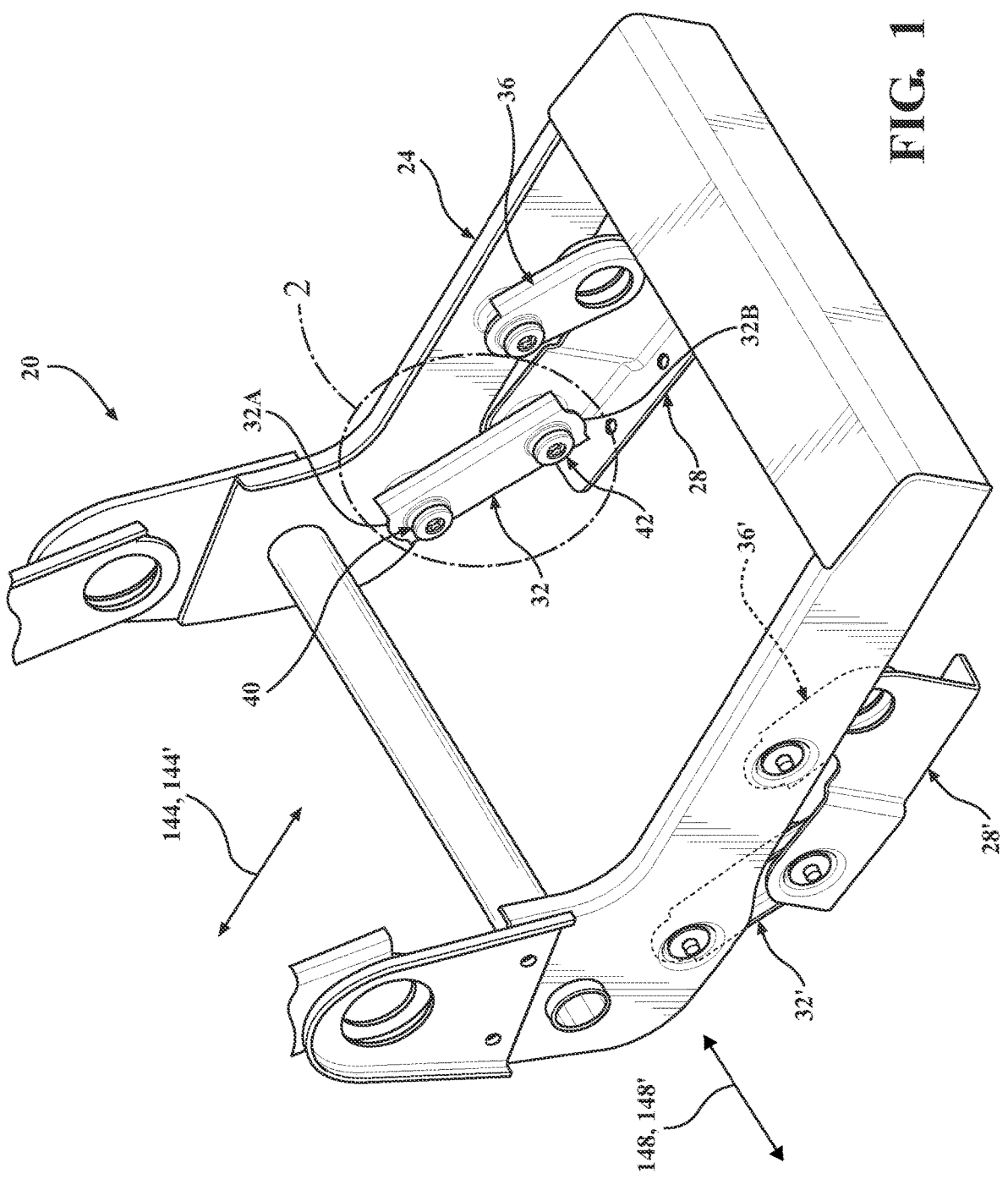
FIG. 1 is a perspective view of a portion of a vehicle seat having a pivot link rotatably coupled to a seat cushion frame and to a seat base by low chuck compliant pivot joints, according to one embodiment of the present invention.

FIG. 1 shows a perspective view of a portion of a vehicle seat 20, showing a seat cushion frame 24 rotationally coupled to a seat base 28 by a rear pivot link 32. In certain embodiments, the seat cushion frame 24 is rotatably coupled to right hand and left hand seat bases 28, 28' by right hand and left hand rear pivot links 32, 32' and optionally by right hand and left hand front pivot links 36, 36'. In the embodiment shown in FIG. 1, an upper compliant pivot joint 40 extends through the rear pivot link 32 near an upper end 32A of the rear pivot link 32 and rotatably couples the rear pivot link 32 to the seat cushion frame 24. Similarly, a lower compliant pivot joint 42 extends through the rear pivot link 32 near a lower end 32B of the rear pivot link 32 and rotatably couples the rear pivot link 32 to the seat base 28. The upper compliant pivot joint 40 and the lower compliant pivot joint 42 are low chuck compliant pivot joints 40, 42, as described in more detail below as a compliant pivot joint 40, 42.

Figure 2:
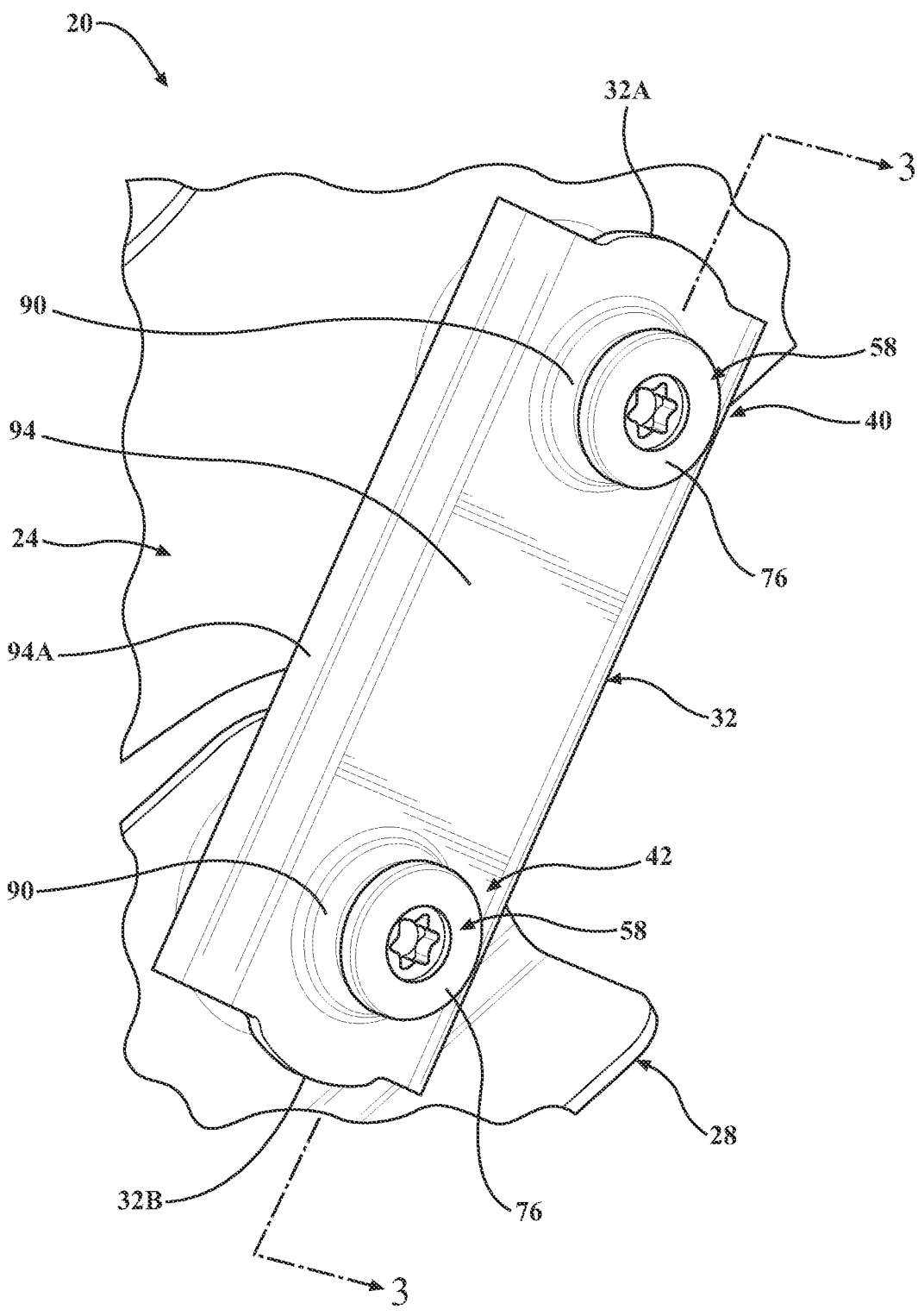
FIG. 2 is an enlarged perspective view of portion 2 of FIG. 1, showing the pivot link coupled to the seat base and to the seat cushion frame by compliant pivot joints.
Figure 3:
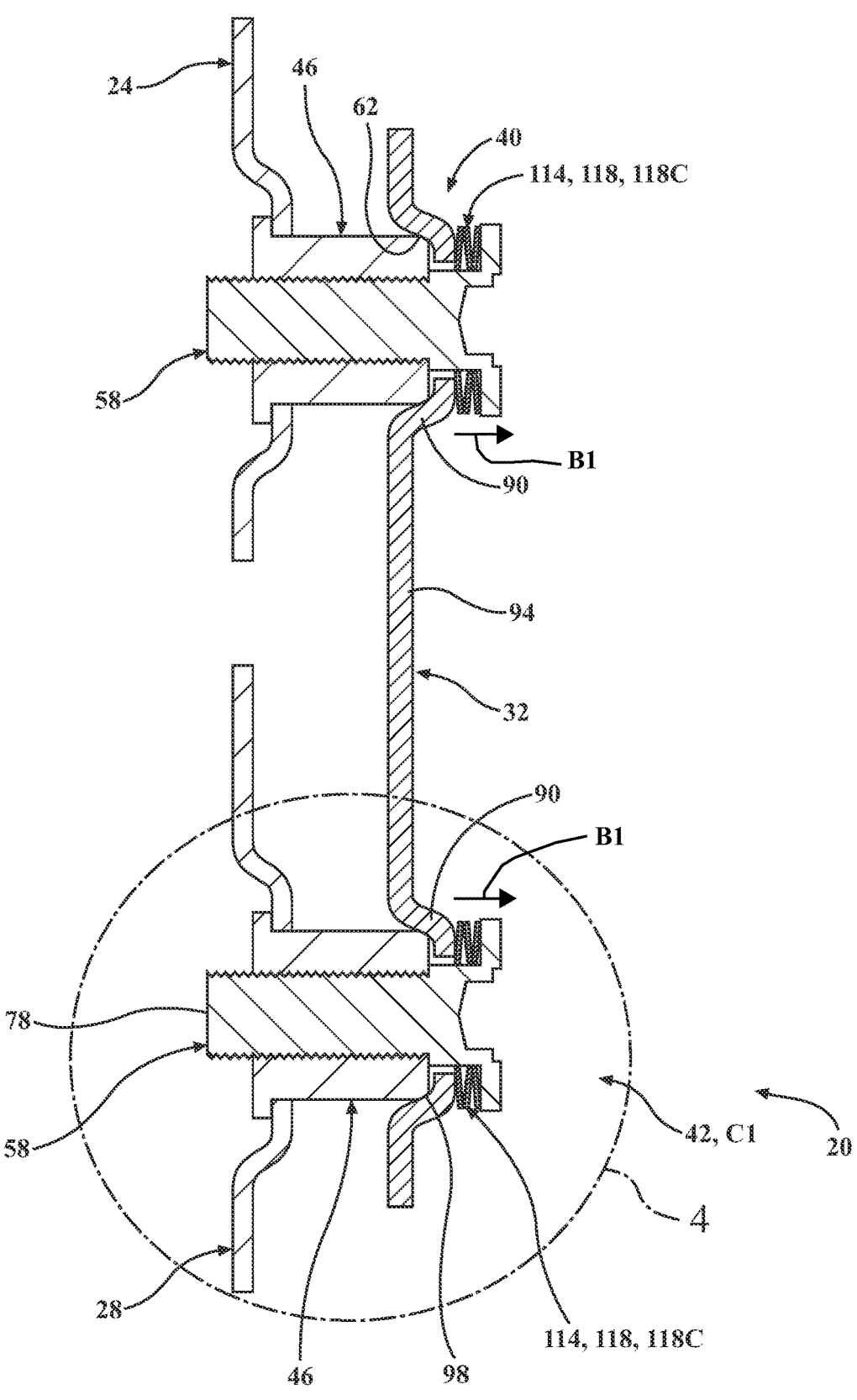
FIG. 3 is a cross-sectional view taken along section line 3-3 of FIG. 2, showing the compliant pivot joints adjoining the pivot link to the seat cushion frame and to the seat base.
Figure 4:
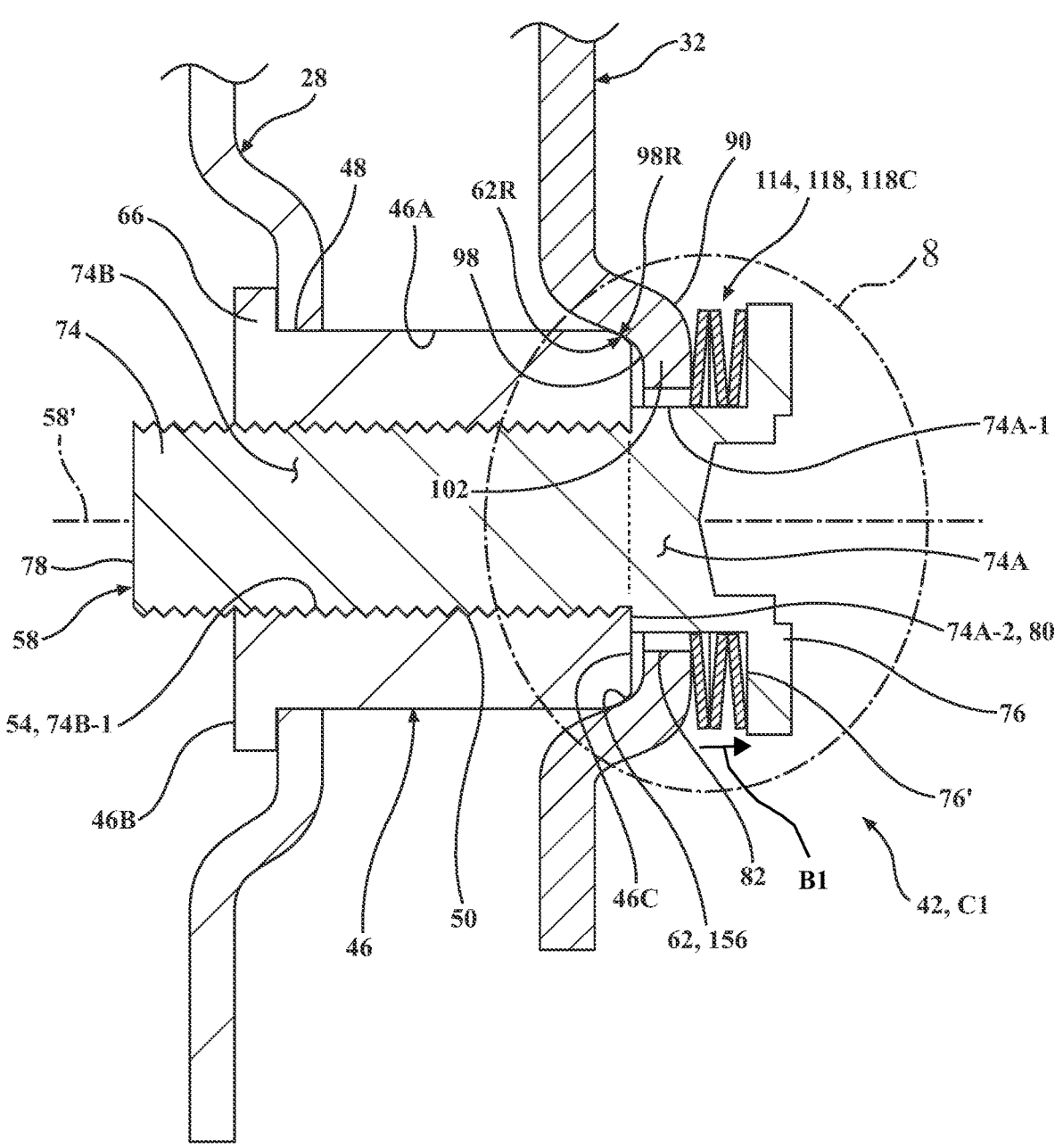
FIG. 4 is an enlarged view of portion 4 of FIG. 3, showing the compliant pivot joint adjoining the pivot link to the seat base.
Figures 6, 7:
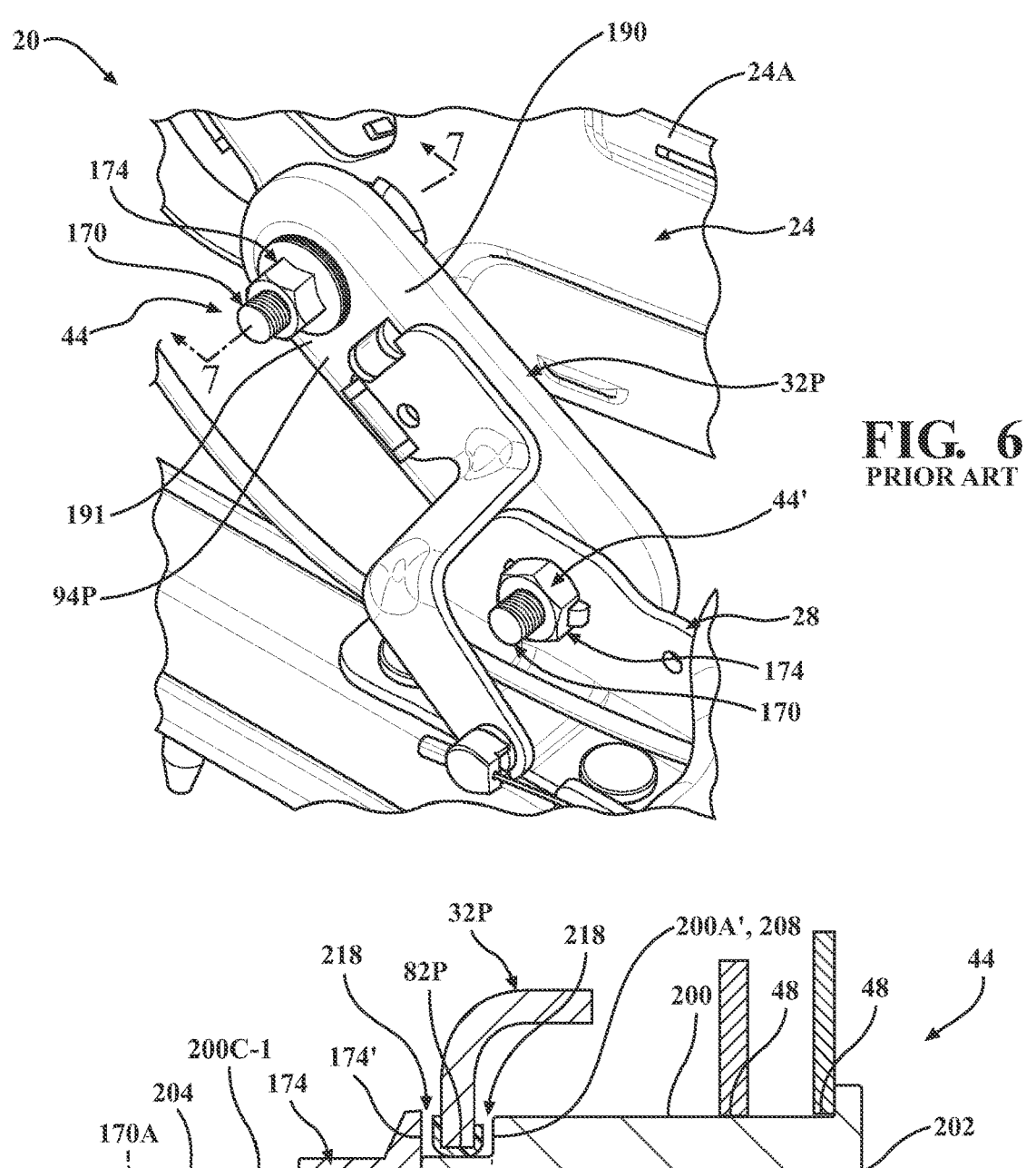
FIG. 6 is an enlarged perspective view of a known seat assembly having a pivot link rotationally coupled to a seat cushion frame and to a seat base by a known bushing pivot joint.
FIG. 7 is an enlarged cross-sectional view of the known bushing pivot joint of FIG. 6 taken along section line 7-7 of FIG. 6, showing lateral clearance within the bushing pivot joint.

The compliant pivot joint 40, 42 shown in FIGS. 1-4 reduces perceived looseness in comparison to a known bushing pivot joint 44 shown in FIGS. 6 and 7. FIGS. 2 and 3 show an enlarged perspective view and a cross-sectional view, respectively, of the compliant pivot joint 40, 42 rotatably coupling the rear pivot link 32 to the seat cushion frame 24 and to the seat base 28. FIG. 4 shows an enlarged cross-sectional view of the lower compliant pivot joint 42. In the embodiment shown in FIGS. 2 and 3, the upper compliant pivot joint 40 is constructed in a similar fashion as the lower compliant lower pivot joint 42. In certain embodiments, the upper and lower compliant pivot joints 40, 42 can have different constructions. It will be understood that one or more of the rear and front pivot links 32, 32', 36, 36' can be rotatably coupled to one or more seat components, such as the seat cushion frame 24 and seat base 28 as non-limiting examples, by the compliant pivot joint 40, 42. In addition, it will be understood that the compliant pivot joint 40, 42 can rotatably attach any type of link and/or frame member to another seat component, including brackets, other frame members, pivotable links, and the like, as desired based on a specific application.

Figure 12:
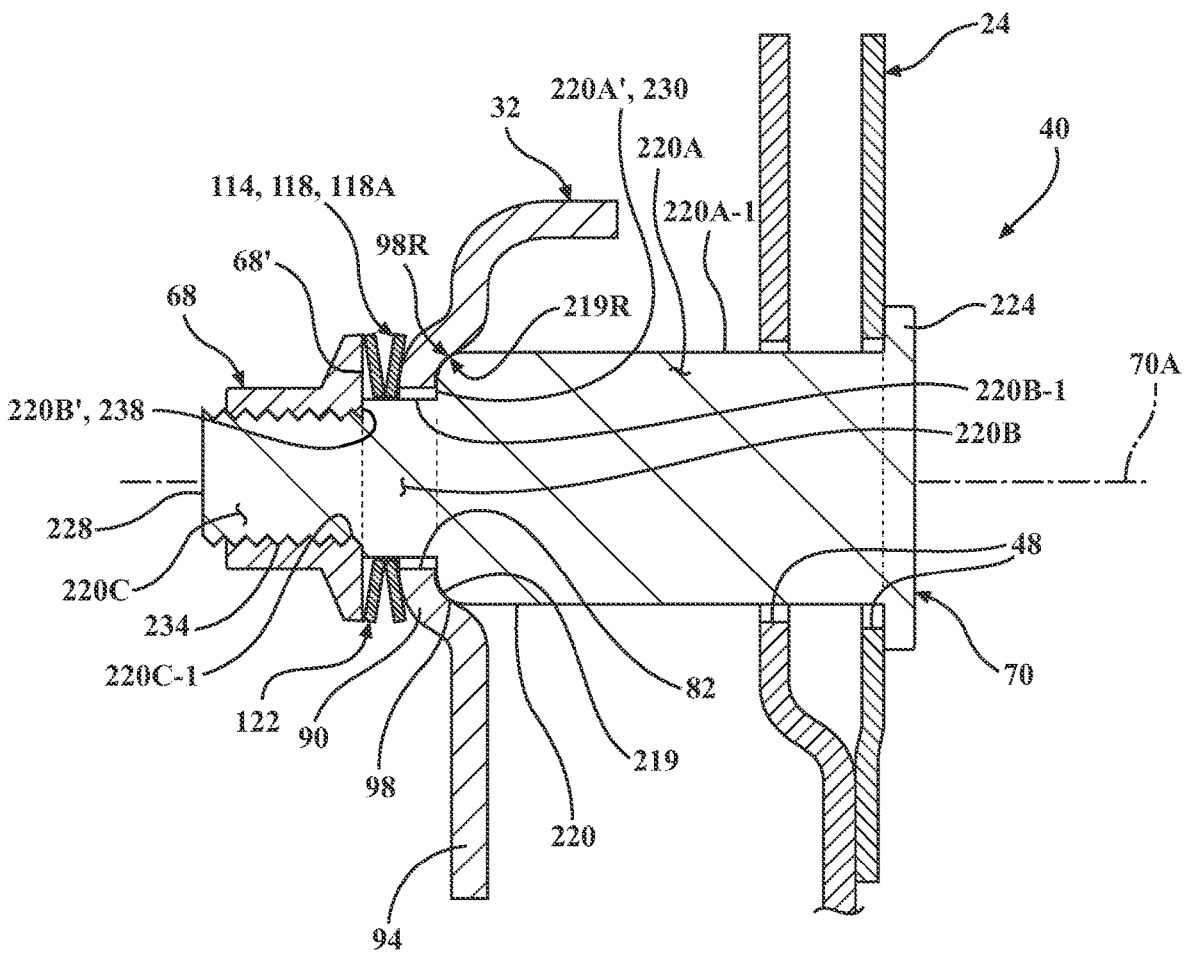
FIG. 12 is a cross-sectional view of a low chuck compliant pivot joint, according to a third embodiment of the present invention.
Figure 13:
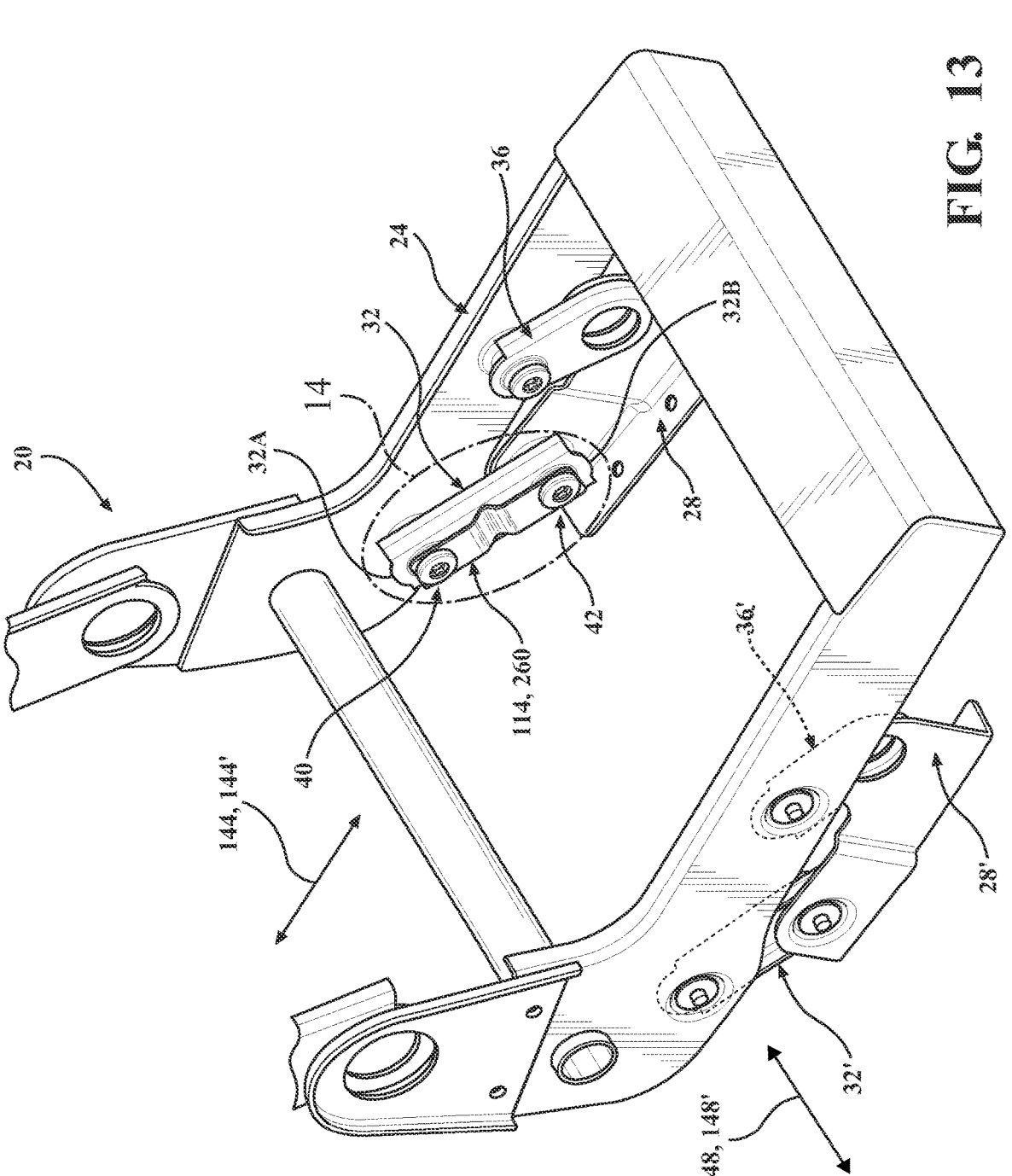
FIG. 13 is a perspective view of a portion of a vehicle seat having a pivot link rotatably coupled to a seat cushion frame and to a seat base by compliant pivot joints connected by a leaf spring, according to a fourth embodiment of the present invention.

The compliant pivot joint 40, 42 shown in FIGS. 3 and 4 includes a clinch nut 46 fixedly coupled to an aperture 48 in each of the seat cushion frame 24 and the seat base 28. The clinch nut 46 has a general cylindrical shape having an outer wall 46A extending between a first end wall 46B and a second end wall 46C. Alternatively, the outer wall 46A can be formed of a plurality of generally flat sides forming a polygon-shaped cylinder such as a hexagon cylinder, a tapered hexagon cylinder, an octagon cylinder, and the like as non-limiting examples. In addition, the clinch nut 46 includes an internal threaded passageway 50 extending between the first and second end walls 46B, 46C and configured to meshingly engage with an external screw thread 54 on a shoulder bolt 58. A curved shoulder surface 62 extends between the outer wall 46A and the second end wall 46C of the clinch nut 46. The curved shoulder surface 62 is generally described by a first radius of curvature 62R. Clinch nuts 46 typically include a clinching feature 66 near the first end wall 46B configured to be frictionally and/or crimpingly engaged with the aperture 48 in seat cushion frame 24 or seat base 28. It will be understood that while a clinch nut 46 is shown and described in the Figures, other types, sizes, and shapes of threaded fasteners, such as a loose nut, a push nut, a swage nut, a welded nut, and the like, can be used without altering the scope of the invention. For example, FIG. 12 shows an alternate embodiment wherein a loose nut 68 is threaded onto a shoulder bolt 70.

The shoulder bolt 58 of the compliant pivot joint 40, 42 shown in FIGS. 3 and 4 includes a generally cylindrical-shaped shaft 74 extending from a lower surface 76' of a bolt head 76 aligned with a longitudinal axis 58' of the shoulder bolt 58 and terminating at a shaft end 78. The shaft 74 includes a first shaft portion 74A extending between the bolt head 76 and a second shaft portion 74B. The first shaft portion 74A is generally cylindrical-shaped with an outer wall 74A-1 extending between the bolt head 76 and a first shaft portion end wall 74A-2. The outer wall 74A-1 of the first shaft portion 74A has a maximum outer diameter less than a minimum outer diameter of the bolt head 76. In addition, the first shaft portion 74A is sized and shaped such that at least a portion of the first shaft portion 74A will pass through an opening 82 in the rear pivot link 32. Further, the bolt head 76 is sized and shaped such that the bolt head 76 is unable to pass through the opening 82 in the rear pivot link 32. More specifically, the bolt head 76 has a minimum outer diameter greater than a maximum inner diameter of the opening 82 in the rear pivot link 32. The second shaft portion 74B is also generally cylindrical-shaped with an outer wall 74B-1 extending between the first shaft portion end wall 74A-2 and the shaft end 78 of the shoulder bolt 58. The outer wall 74B-1 of the second shaft portion 74B has a maximum outer diameter less than a minimum outer diameter of the first shaft portion 74A. The first shaft portion end wall 74A-1 defines a shoulder 80 in the shoulder bolt 58. The second shaft portion 74B includes an external screw thread 54 sized and shaped to meshingly engage with the internal threaded passageway 50 of the clinch nut 46. The shoulder 80 of the shoulder bolt 58 abuts the second end wall 46C of the clinch nut 46 when the shoulder bolt 58 is assembled with the clinch nut 46, as shown in FIG. 4.

Referring to FIGS. 2 through 4, the rear pivot link 32 extends between opposing upper and lower ends 32A, 32B with a cup-shaped protrusion 90 extending from a main portion 94 of the rear pivot link 32 aligned with each of the compliant pivot joints 40, 42. While the main portion 94 of the rear pivot link 32 is shown as a generally flat bracket with curved sides 94A in FIG. 2, the rear pivot link 32 can have any size and shape suitable for specific applications without varying the scope of the invention. Referring to FIG. 4, the opening 82 in the rear pivot link 32 has a center point aligned with the longitudinal axis 58' of the shoulder bolt 58 when the rear pivot link 32 is assembled as part of the compliant pivot joint 40, 42. The cup-shaped protrusion 90 is also centered on the longitudinal axis 58' with the opening 82 passing through the cup-shaped protrusion 90. In the embodiment shown in FIG. 4, the cup-shaped protrusion 90 includes a curved portion 98 having a second radius of curvature 98R and optionally includes a generally planar portion 102 surrounding the circumference of the opening 82. The first radius of curvature 62R of the curved shoulder surface 62 of the clinch nut 46 and the second radius of curvature 98R of the curved portion 98 of the cup-shaped protrusion 90 are selected such that the curved shoulder surface 62 interacts with the curved portion 98 with a desired pressure angle. In one embodiment, the cup-shaped protrusion 90 includes a curved portion 98 having a second radius of curvature 98R of about 1.8 mm, a planar portion 102 of about 1.5 mm, an opening 82 in the rear pivot link 32 having an inner diameter of about 15 mm, and an overall height between the planar portion 102 and the main portion 94 of the rear pivot link 32 of about 5.8 mm. The outer wall 46A of the clinch nut 46 has an outer diameter of about 21.75 mm with a first radius of curvature 62R of the curved shoulder surface 62 of about 1.2 mm. It will be understood that specific dimensions, sizes, materials, and shapes of components forming the compliant pivot joint 40, 42 can vary without altering the scope of the invention, including but not limited to adding additional components.

In addition, it will also be understood that in certain embodiments when the compliant pivot joint 40, 42 rotationally couples the rear pivot link 32 to the seat cushion frame 24, the cup-shaped protrusion 90 can be formed in one of the rear pivot link 32 and the seat cushion frame 24, with the clinch nut 46 being fixedly coupled to the other one of the rear pivot link 32 and the seat cushion frame 24 without varying the scope of the invention. The same option also applies when the compliant pivot joint 40, 42 rotationally couples any pivot link 32, 32', 36, 36' to any other frame member, the seat cushion frame 24 and the seat base 28 being non-limiting examples. In the embodiment shown in FIGS. 3 and 4, the rear pivot link 32 includes the cup-shaped protrusion 90 with the clinch nut 46 fixedly coupled to the seat cushion frame 24 and the seat base 28. However, in alternate embodiments, the cup-shaped protrusion 90 can be included in the frame members with the clinch nut 46 being fixedly coupled to the rear pivot link 32. In addition, certain embodiments include a loose nut 68 meshingly coupled to the shoulder bolt 70 without the loose nut 68 being fixedly coupled to either the rear pivot link 32 or the frame member, such as illustrated in the embodiment shown in FIG. 12.

Figure 10:
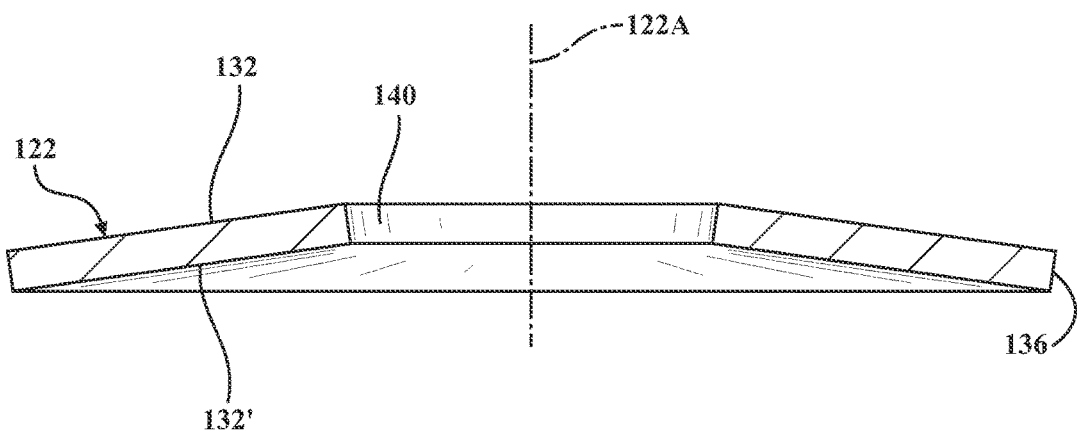
FIG. 10 is a cross-sectional view of a conical washer, according to one embodiment of the present invention.
Figure 11:
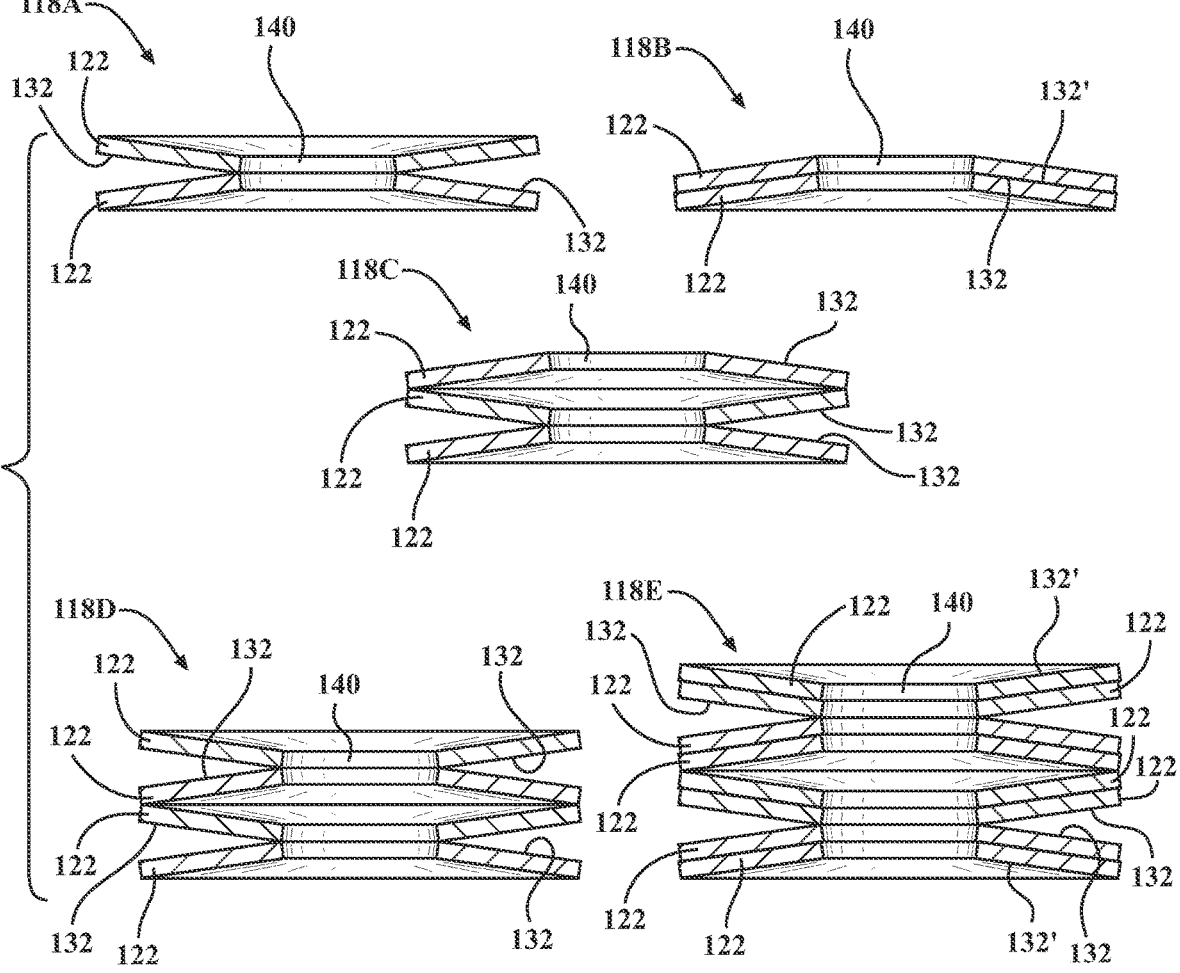
FIG. 11 is a cross-sectional view of exemplary spring disc stacks comprising combinations of stacked conical washers, according to embodiments of the present invention.

In the embodiment shown in FIGS. 3 and 4, a bias member 114 is assembled between the lower surface 76' of the bolt head 76 and the cup-shaped protrusion 90 of the rear pivot link 32. The bias member 114 is trapped between the bolt head 76 and the cup-shaped protrusion 90 when the shoulder bolt 58 engages with the clinch nut 46. One embodiment of the bias member 114 is a stack 118 of conical washers 122. A single exemplary conical washer 122 is shown in FIG. 10 and exemplary stacking patterns 118A-118E of conical washers 122 are shown in FIG. 11. Referring to FIG. 10, the conical washer 122 is a disc-shaped washer comprising opposing upper and lower surfaces 132, 132' and an outer edge surface 136 extending between the opposing upper and lower surfaces 132, 132' with a hole 140 passing between opposing upper and lower surfaces 132, 132' aligned with a longitudinal axis 122A of the conical washer 122. The upper surface 132 is generally convex shaped while the lower surface 132' is generally concave shaped. One exemplary conical washer 122 has an outer diameter of about 26 mm, a minimum thickness between the opposing upper and lower surfaces 132, 132' of about 0.6 mm, a maximum axial distance between the opposing upper and lower surfaces 132, 132' of about 1.4 mm, and an inner diameter of the hole 140 of about 13.6 mm. Suitable conical washers 122 are formed of high carbon steel, alloy steel, stainless steel, heat treated steel, tempered steel, and the like as non-limiting examples.

Exemplary stacking patterns 118A-118E of a stack 118 of conical washers 122 are shown in FIG. 11. The stack 118 of conical washers 122 is alternately described hereinafter as a spring disc stack 118. Referring to FIG. 11, the spring disc stack 118A comprises two conical washers 122 stacked in series. Conical washers 122 are stacked in series when an upper surface 132 of a first conical washer 122 abuts an upper surface 132 of a second conical washer 122. In contrast, spring disc stack 118B illustrates two conical washers 122 stacked in parallel with a lower surface 132' of a first conical washer 122 abutting an upper surface 132 of a second conical washer 122. Spring disc stacks 118C and 118D show three and four conical washers 122 stacked in series, respectively. Spring disc stack 118E illustrates a stack of eight conical washers 122 stacked in a combination of parallel and series. The number, stacking pattern, dimensions, and material of the selected stack 118 of conical washers 122 suitable for a specific application is determined based in part on the amount of expected fore-aft and lateral loads 144', 148' applied to the vehicle seat 20 (shown in FIG. 1) as well as specific dimensions of the components within the compliant pivot joint 40, 42.

The spring disc stack 118, shown in FIGS. 3 and 4, can be adjusted based on the range of lateral compensation needed to account for different amounts of expected lateral tolerance variation. In certain embodiments, the axial compliant distance the spring disc stack 118 can overcome to prevent chuck is balanced by the bias force B1 applied by the spring disc stack 118 within the compliant pivot joint 40, 42 to minimize rotational effort to rotate the compliant pivot joint 40, 42. As such, in some embodiments of the compliant pivot joint 40, 42, in order to maintain rotational friction within a target range, the selected spring disc stack 118 configuration will be insufficient to prevent chuck when the applied loads 144', 148' are above a predefined target range. Typically, the compliant pivot joint 40, 42 is configured to prevent and/or reduce the tendency to chuck up to a predefined amount of applied load 144', 148' in the fore-aft and lateral directions 144, 148 while maintaining the rotational effort less than a predefined target. The compliant pivot joints 40, 42 shown in FIGS. 3 and 4 are designed to provide compliance to accommodate up to +/−3 degrees of link rotation as well as an amount of dimensional variation among the components of the vehicle seat 20. In addition, the rotational friction of the compliant pivot joint 40, 42 is preferably designed to be less than about 1 Nm. It will be understood that the compliant pivot joint 40, 42 can be configured to accommodate a range of degrees of link rotation by varying the number of conical washers, and the stacking pattern of the conical washers, as well as size and shape of individual components within the compliant pivot joint 40, 42 without varying the scope of the invention.

FIGS. 3 and 4 show one preferred embodiment comprising a spring disc stack 118C comprising three conical washers 122 assembled in series. A second preferred embodiment is a spring disc stack 118A comprising two conical washers 122 assembled in series, as shown in FIG. 12. However, it will be understood that the spring disc stack 118 can comprise any combination of number and stacking pattern of conical washers 122 without varying the scope of the invention. A conical washer 122 is alternately described as a spring washer, a Belleville washer, a disc spring, a conical spring washer, a cupped spring washer, and the like as non-limiting examples. It will be understood that the size, material, and shape of the conical washer 122 can vary without altering the scope of the invention, including use of other shapes of spring washers such as curved spring washers, wave spring washers, Clover®Dome spring washers, multi-wave compression spring washers, finger spring washers, poly-wave compression disc springs, and the like, as non-limiting examples. Further, it will be understood that the spring disc stack 118 can comprise one or more types, sizes, shapes, and materials of spring washers without varying the scope of the invention.

Figure 5:
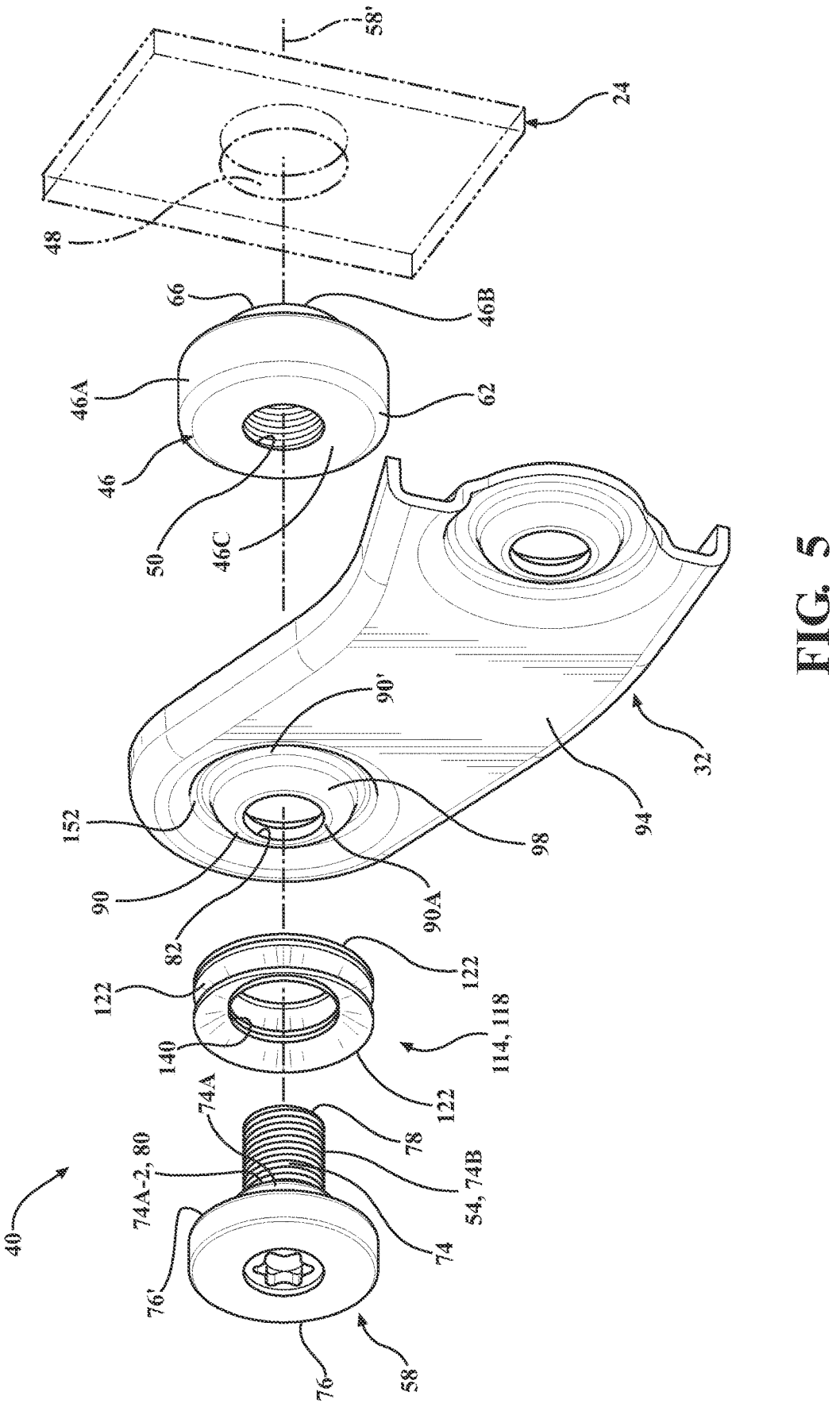
FIG. 5 is an exploded view of a compliant pivot joint adjoining a pivot link to a seat frame component, according to a second embodiment of the present invention.

FIG. 5 shows an exploded view of another embodiment of the compliant pivot joint 40 of FIG. 1. Elements in FIG. 5 that are the same or similar to those used above in the embodiment shown in FIGS. 2-4 have the same reference numbers for simplicity. As with the first embodiment shown in FIGS. 2-4, the compliant pivot joint 40 shown in FIG. 5 includes a shoulder bolt 58, a bias member 114 comprising a spring disc stack 118 of 3 conical washers 122 stacked in series, a rear pivot link 32, a clinch nut 46, and a seat cushion frame 24. The rear pivot link 32 includes an optional recessed channel 152 extending around an outer perimeter 90' of the cup-shaped protrusion 90. Due to the recessed channel 152, an upper surface 90A of the cup-shaped protrusion 90 may be in line with the main portion 94 of the rear pivot link 32, raised above the main portion 94 of the rear pivot link 32, or recessed below the main portion 94 of the rear pivot link 32 without varying the scope of the invention.

During assembly of the embodiment shown in FIG. 5, the clinching feature 66 of the clinch nut 46 is assembled with the seat cushion frame 24 such that the internal threaded passageway 50 of the clinch nut 46 is aligned with the aperture 48 in the seat cushion frame 24. In alternate embodiments, a weld nut is substituted for the clinch nut 46 with the weld nut being welded to the seat cushion frame 24. The end 78 of the shoulder bolt 58 is passed through the holes 140 in the conical washers 122 and through the opening 82 in the rear pivot link 32. When the end 78 of the shoulder bolt 58 is aligned with the internal threaded passageway 50 in the clinch nut 46, the shoulder bolt 58 is rotated such that the external screw thread 54 of the shoulder bolt 58 is meshingly engaged with the internal threaded passageway 50 of the clinch nut 46. When fully assembled, the shoulder 80 of the shoulder bolt 58 is frictionally engaged with the second end wall 46C of the clinch nut 46, such as illustrated in FIG. 4. In addition, the curved shoulder surface 62 of the clinch nut 46 is frictionally engaged with the cup-shaped protrusion 90 in the rear pivot link 32 when the shoulder bolt 58 is fully assembled with the clinch nut 46. During assembly, grease 156 (shown in FIG. 4) is optionally added between the cup-shaped protrusion 90 and the curved shoulder surface 62 of the clinch nut 46 to reduce the friction between the rear pivot link 32 and the clinch nut 46. The spring disc stack 118 biases the bolt head 76 away from the rear pivot link 32 and retains the curved shoulder surface 62 of the clinch nut 46 in frictional engagement with the cup-shaped protrusion 90 of the rear pivot link 32.

In contrast to the compliant pivot joint 40, 42 shown in FIGS. 1-5, exemplary known bushing pivot joints 44, 44' are shown in FIGS. 6 and 7. Elements in FIGS. 6 and 7 that are the same or similar to those used above in the embodiment shown in FIGS. 1-5 have the same reference numbers for simplicity. FIG. 6 shows a pivot link 32P rotatably coupled to a seat cushion frame 24 and a seat base 28 by known upper and lower bushing pivot joints 44, 44'. A cross-sectional view of the known upper bushing pivot joint 44 is shown in FIG. 7. Referring to FIG. 7, the known bushing pivot joint 44 includes a shoulder bolt 170, the pivot link 32P, a nut 174, and the seat cushion frame 24.

Referring to FIGS. 6 and 7, the pivot link 32P has an elongated shape including a main portion 94P that is generally planar and curved sides 190 projecting from the main portion 94P. While the known pivot links 32P can vary in size, shape, and contour, typically the known pivot links 32P include a generally planar section 191 surrounding an opening 82P in the known pivot link 32P.

As shown in FIG. 7, the opening 82P in the pivot link 32P is lined with a bushing 192, as is generally known in the art. The bushing 192 is generally ring-shaped with a passageway 192' extending axially through the bushing 192. Typically, the bushing 192 comprises a metal, such as steel, and/or a plastic material. The bushing 192 reduces radial looseness between the shoulder bolt 170 and the opening 82P in the pivot link 32P and controls friction. However, a press is required to install a steel bushing 192 into the opening 82P in the pivot link 32P. In addition, plastic bushings 192 have retention issues.

The known seat cushion frame 24 shown in FIGS. 6 and 7 includes first and second frame members 24A, 24B. Each of the first and second frame members 24A, 24B include an aperture 48 aligned with the known bushing pivot joint 44, 44'.

In the known bushing pivot joint 44 shown in FIG. 7, the shoulder bolt 170 has a generally cylindrical-shaped shaft 200 projecting from a bolt head 202 aligned with a longitudinal axis 170A of the shoulder bolt 170 and terminating at a shaft end 204. The shaft 200 typically comprises a first shaft portion 200A, a second shaft portion 2008, and a third shaft portion 200C. The first shaft portion 200A is generally cylindrical-shaped with an outer wall 200A-1 extending between the bolt head 202 and a first shaft portion end wall 200A'. The outer wall 200A-1 of the first shaft portion 200A has an outer diameter less than an outer diameter of the bolt head 202. Typically, the outer diameter of the bolt head 202 is generally greater than an inner diameter of the apertures 48 in the seat cushion frame 24. This prevents the bolt head 202 from passing through the apertures 48 in the seat cushion frame 24. In addition, the first shaft portion 200A is sized and shaped such that at least a portion of the first shaft portion 200A will pass through the apertures 48 in the seat cushion frame 24.

Referring to the known bushing pivot joint 44 shown in FIG. 7, the second shaft portion 200B is generally cylindrical-shaped with an outer wall 200B-1 extending between the first shaft portion end wall 200A' and a second shaft portion end wall 200B'. Further, the outer wall 200B-1 has an outer diameter selected such that at least a portion of the second shaft portion 200B will pass through the passageway 192' in the bushing 192. In the exemplary known embodiment shown in FIG. 7, the outer diameter of the second shaft portion 200B is less than the outer diameter of the first shaft portion 200A with the end wall 200A' extending between the second shaft portion 200B and the first shaft portion 200A defining a first shoulder 208.

Also shown in FIG. 7, extending from the second shaft portion end wall 200B' of the shoulder bolt 170 is the third shaft portion 200C. Typically, the third shaft portion 200C has a general cylindrical shape with an outer surface 200C-1 including an external screw thread configured to meshingly engage with an internal threaded passageway 210 in the nut 174. In addition, the outer surface 200C-1 has an outer diameter less than the outer diameter of the second shaft portion 200B with the end wall 200B' extending between the third shaft portion 200C and the second shaft portion 200B defining a second shoulder 214. When the nut 174 is assembled with the shoulder bolt 170, a base surface 174' of the nut 174 abuts the second shoulder 214 of the shoulder bolt 170.

The known bushing pivot joint 44 of FIG. 7 is formed by passing the shaft end 204 of the shoulder bolt 170 through the apertures 48 in the seat cushion frame 24 and through the passageway 192' in the bushing 192 with the bolt head 202 abutting the seat cushion frame 24. The nut 174 is aligned with the third shaft portion 200C of the shoulder bolt 170 and threaded onto the shaft end 204 until the base surface 174' of the nut 174 frictionally engages with the second shoulder 214.

During operation, the pivot link 32P rotates around the known bushing pivot joint 44 shown in FIG. 7. Lateral clearance 218 is provided between the base surface 174' of the nut 174 and the bushing 192, as well as between the bushing 192 and the first shoulder 208 of the shoulder bolt 170, to allow the pivot link 32P to be rotated. Rotation of the pivot link 32P can be restricted if the base surface 174' of the nut 174 and the first shoulder 208 of the shoulder bolt 170 are in direct contact with the bushing 192. Therefore, the first and second shoulders 208, 214 are spaced apart in the axial direction 170A by a distance greater than an axial width of the bushing 192 to allow free rotation of the pivot link 32P. Thus, there is inherent lateral clearance 218 included in the known bushing pivot joint 44 to limit the amount of friction in the known bushing pivot joint 44. Further, the lateral clearance 218 is included to prevent friction caused by dimensional variation between the seat cushion frame 24, the seat base 28, and tracks attached to the seat base 28. In addition, radial loading can result in deformation of the bushing 192 which can increase perceived radial looseness.

The lateral clearance 218 in the known bushing pivot joint 44 of FIG. 7 can result in perceived movement of the seat cushion frame 24 in the fore-aft and lateral directions 144, 148 (shown in FIG. 1) when fore-aft and/or lateral loads 144', 148' are applied to the vehicle seat 20. Loads 144', 148' applied to the vehicle seat 20 in the fore-aft direction 144 and/or the lateral direction 148 can result in the bushing pivot joints 44, 44' deflecting under load. Movement, deflection, and/or chucking of the vehicle seat 20 in the fore-aft and/or lateral directions 144, 148 when loads 144', 148' are applied to the vehicle seat 20 can be perceived as looseness in the known bushing pivot joints 44, 44'. Perceived looseness in the bushing pivot joints 44, 44' may be considered objectionable based in part on the magnitude of the perceived looseness. Radial loading on the bushing pivot joints 44, 44' can cause deformation and degradation of the bushing 192 with a subsequent increase in radial looseness over time. The inherent lateral clearance 218 in combination with increased clearance due to degradation of the bushings 192 in the bushing pivot joints 44, 44' can result in buzz, squeak, and rattle (BSR) noises when the vehicle seat 20 is vibrated as the vehicle travels along a road surface.

Compliant pivot joints 40, 42, such as shown in FIGS. 1-5, minimize perceived looseness in comparison to the typical bushing pivot joints 44, 44' shown in FIGS. 6 and 7. Perceived deflection of the compliant pivot joint 40, 42 is less than the perceived deflection of the known bushing pivot joints 44, 44' when loads 144', 148' are applied to the vehicle seat 20 in the fore-aft direction 144 and/or the lateral direction 148. Even though the compliant pivot joint 40, 42 includes lateral clearance between the bolt head 76 and the rear pivot link 32 which allows a certain amount of lateral rotation of the rear pivot link 32, the bias member 114 reduces the perception of chucking since there is always a bias force B1 applied between the bolt head 76 and the rear pivot link 32, as illustrated in FIG. 4. The bias force B1 also urges the curved shoulder surface 98 towards the cup-shaped protrusion 90 via the shoulder bolt 58 being fixedly coupled to the clinch nut 46. As a result, the bias member 114 reduces buzz, squeak, and rattle (BSR) noises associated with the compliant pivot joint 40, 42 since the bias member 114 continually applies the bias force B1 within the compliant pivot joint 40, 42.

Preferably, both pivot joints 40, 42 attaching the rear pivot link 32 to other frame members are compliant pivot joints 40, 42, such as shown in FIGS. 1-5. The bias member 114, the cup-shaped protrusion 90, and the curved shoulder surface 62 of the clinch nut 46 allow the compliant pivot joint 40, 42 to flex under load. Mixing of a compliant pivot joint 40, 42 and a non-compliant pivot joint 44 (such as a bushing pivot joint 44) within a single rear pivot link 32 is less desirable as this may result in a reduced bias force B1 and may result in perceived joint chuck. However, in certain embodiments, a single compliant pivot joint 40, 42 provides acceptable resistance to perceived chucking.

Figure 8:
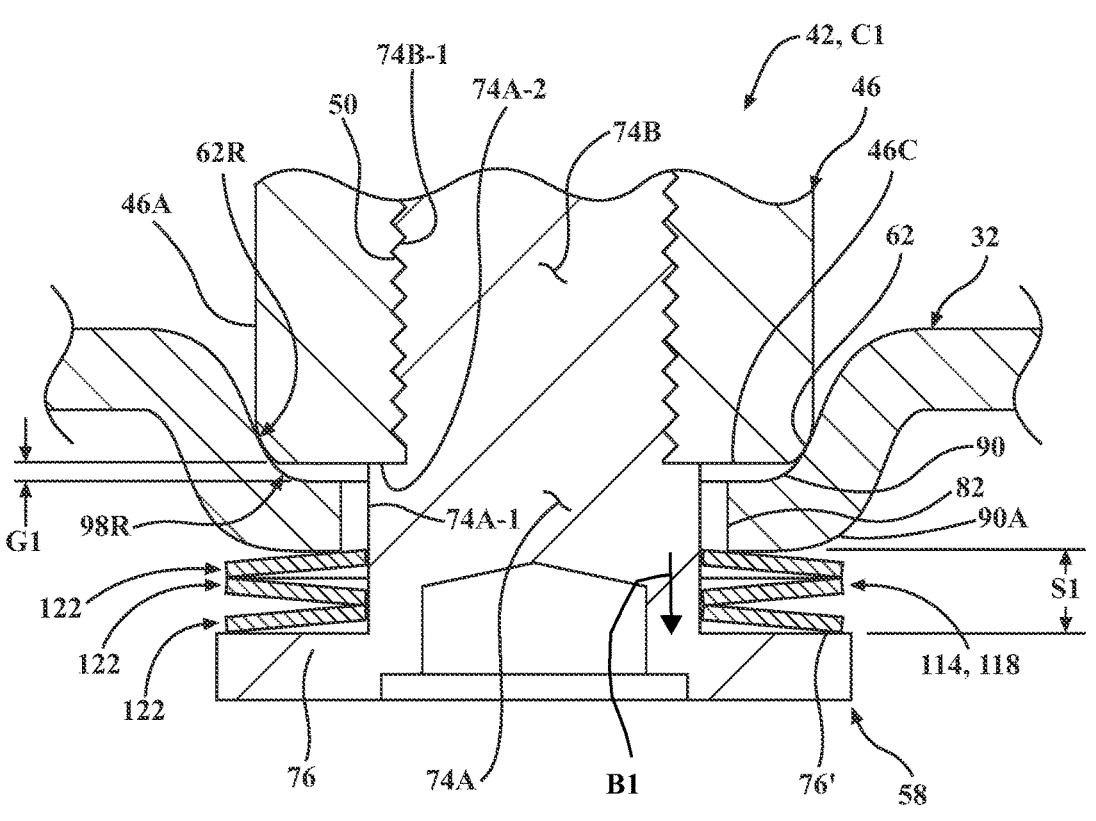
FIG. 8 is an enlarged cross-sectional view of portion 8 of FIG. 4, showing the compliant pivot joint in an unloaded condition.
Figure 9:
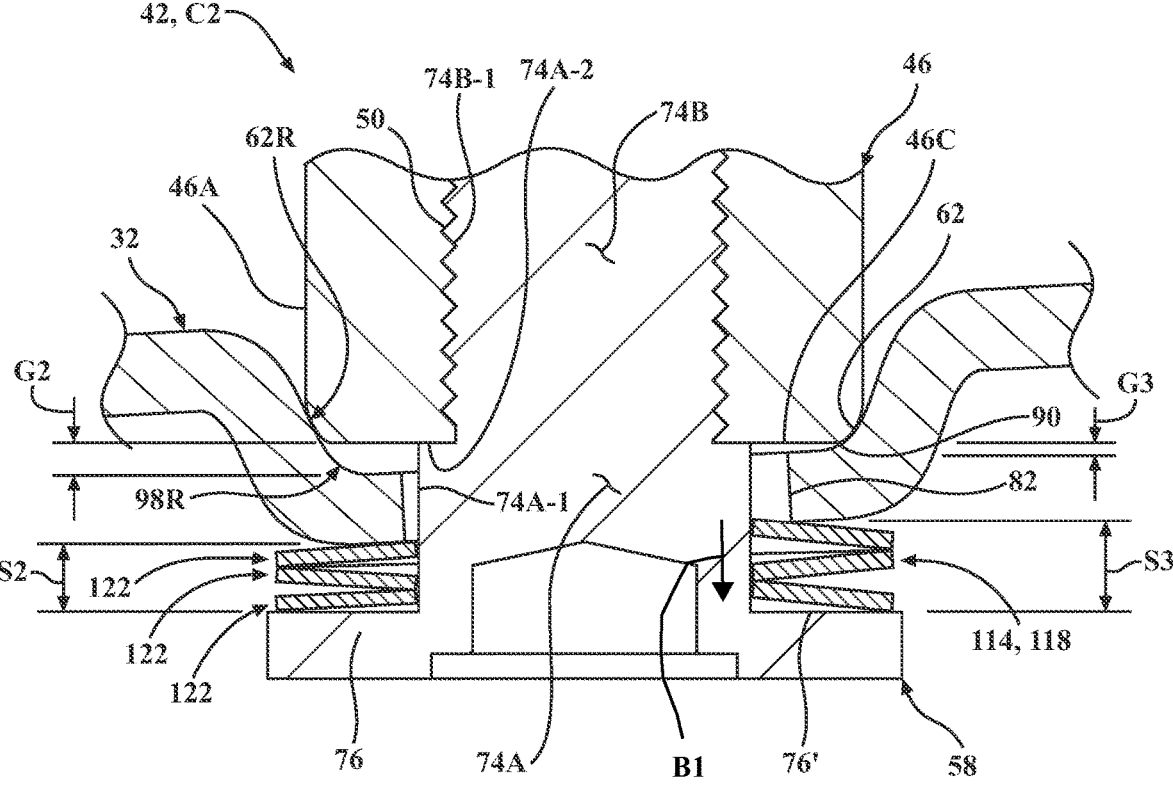
FIG. 9 is an enlarged cross-sectional view of portion 8 of FIG. 4, showing the compliant pivot joint in a loaded condition.

FIGS. 8 and 9 are enlarged views of portion 8 of the compliant pivot joint 42 shown in FIG. 4. FIGS. 8 and 9 illustrate how the bias member 114 between the bolt head 76 and the rear pivot link 32 in combination with the cup-shaped protrusion 90 and curved shoulder surface 62 on the clinch nut 46 reduce perceived looseness in the compliant pivot joint 42.

FIG. 8 shows the compliant pivot joint 42 in an unloaded condition C1 with the shoulder bolt 58 centered in the opening 82 through the rear pivot link 32 with the clinch nut 46 centered in the cup-shaped protrusion 90. When the compliant pivot joint 42 is in the unloaded condition C1 shown in FIG. 8, there is an axial gap GT between the second end wall 46C of the clinch nut 46 and the opening 82 in the rear pivot link 32. The axial gap GT is generally uniform around the perimeter of the opening 82 in the rear pivot link 32. Further, the stack 118 of conical washers 122 has a compressed axial height S1 that is generally uniform around the perimeter of the opening 82 in the rear pivot link 32.

FIG. 9 illustrates the compliant pivot joint 42 of FIG. 8 when a load 144', 148' is applied in the fore-aft and/or the lateral directions 144, 148. More specifically, FIG. 9 shows one embodiment of the compliant pivot joint 42 in a loaded condition C2. When the compliant pivot joint 42 is subjected to a load 144', 148' applied in the fore-aft and/or the lateral directions 144, 148, the rear pivot link 32 is rotated with respect to the shoulder bolt 58 such that axial gaps G2, G3 between the second end wall 46C of the clinch nut 46 and the opening 82 in the rear pivot link 32 are not uniform. This results in increased compression of the spring disc stack 118 on one side of the compliant pivot joint 42 in comparison to an opposing side, as shown by stack heights S2 and S3 in FIG. 9. The spring disc stack 118 can be compressed and/or expanded as required to maintain a bias force B1 biasing the clinch nut 46 towards an engaged position with the cup-shaped protrusion 90 in the rear pivot link 32. Preferably, force provided by spring disc stack 118 is high enough to prevent chuck within the compliant pivot joint 40, 42 but low enough to meet rotational effort targets. In certain embodiments, compliant pivot joint 40, 42 have rotational friction designed to be less than about 1 Nm. It will be understood that the rotational friction can vary in other embodiments without altering the scope of the invention.

In addition, when load 144', 148' is applied to the compliant pivot joint 40, 42, the curved shoulder surface 62 of the clinch nut 46 can rotate within the cup-shaped protrusion 90 of the rear pivot link 32, as shown in FIG. 9. In FIG. 9, the axial gap G2 between the upper surface 46C of the clinch nut 46 and the opening 82 in the cup-shaped protrusion 90 is greater on one side of the clinch nut 46 than the axial gap G3 on an opposing side of the clinch nut 46. The curved shoulder surface 62 of the clinch nut 46 is maintained in contact with the cup-shaped protrusion 90 in the rear pivot link 32 even though the rear pivot link 32 is rotated from the unloaded condition shown in FIG. 8. Contact between the clinch nut 46 and the cup-shaped protrusion 90 in the rear pivot link 32 is maintained even though the rear pivot link 32 has been rotated because the bias member 114 between the bolt head 76 and the cup-shaped protrusion 90 automatically expands and contracts to maintain a bias force B1 on the shoulder bolt 58.

Referring to FIGS. 8 and 9, since the bias member 114 is compressed during assembly, the amount of compression of the bias member 114 can vary within a range wherein the bias member 114 maintains a bias force B1 on the compliant pivot joint 42. For example, FIGS. 8 and 9 show a bias member 114 comprising a spring disc stack 118 of three conical washers 122 stacked in series. In certain embodiments, a plurality of conical washers 122 are stacked and wrapped together by shrink wrap for assembly purposes. The spring disc stacks 118 provide compliance within the compliant pivot joints 40, 42.

There is less perceived looseness in the compliant pivot joints 40, 42 in comparison to the known bushing pivot joints 44, 44' since the bias member 114 of FIG. 9 maintains contact between the clinch nut 46 and the cup-shaped protrusion 90. In addition, there is less perceived chucking with the compliant pivot joints 40, 42 in comparison to the bushing pivot joints 44, 44' since the compliant pivot joints 40, 42 maintain contact between the clinch nut 46 and the cup-shaped protrusion 90 even when fore-aft and lateral loads 144', 148' are applied to the vehicle seat 20. Also, the bias member 114 compensates for wear of components over time, maintaining a bias force B1 even after components degrade. Since the compliant pivot joint 40, 42 is always biased by the bias member 114, there is less buzz, squeak, and rattle (BSR) noises associated with the compliant pivot joints 40, 42 in comparison to typical bushing pivot joints 44, 44'. The compliant pivot joint 40, 42 is a low friction and low chuck design that can be used with any structure link joints. In addition, the compliant pivot joints 40, 42 can replace existing bushing pivot joints 44, 44'.

Further, it will be understood that while the cup-shaped protrusions 90 are shown as part of the rear pivot link 32 with the clinch nuts 46 attached to the seat cushion frame 24 and the seat base 28, such as illustrated in FIG. 3, the cup-shaped protrusions 90 can be formed on any frame member in alternate embodiments, including but not limited to the seat cushion frame 24 and the seat base 28, with the clinch nuts 46 fixedly coupled to the rear pivot link 32 without altering the scope of the invention. In certain embodiments, the compliant pivot joints 40, 42 are configured such that one of the compliant pivot joints 40, 42 has a cup-shaped protrusion 90 on the rear pivot link 32 with the clinch nut 46 fixedly coupled to one of the seat cushion frame 24 and the seat base 28 with the other one of the compliant pivot joints 40, 42 having the cup-shaped protrusion 90 as part of the other one of the seat cushion frame 24 and the seat base 28 with the respective clinch nut 46 fixedly coupled to the rear pivot link 32. It will also be understood that the clinch nut 46 can be replaced by a weld nut and other similar components without altering the scope of the invention as long as the features of the interface between the clinch nut 46 and the cup-shaped protrusion 90 are maintained with the desired target pressure angle.

FIG. 12 shows an alternate embodiment of a compliant pivot joint 40, 42. Elements in FIG. 12 that are the same or similar to those used above in the embodiment shown in FIGS. 1-4 have the same reference numbers for simplicity. Only the significant differences in relation to the embodiment shown in FIG. 4 are highlighted below. As with the first embodiment shown in FIGS. 1-4, the compliant pivot joint 40 shown in FIG. 12 includes an opening 82 through a rear pivot link 32, apertures 48 through the seat cushion frame 24, and a bias member 114 comprising a spring disc stack 118. One substantial difference involves replacing the shoulder bolt 58 and clinch nut 46 of FIG. 4 with an alternate shoulder bolt 70 and a loose nut 68. Further, the curved shoulder surface 62 on the clinch nut 46 of FIG. 4 has been replaced by a curved shoulder surface 219 on the shoulder bolt 70. The curved shoulder surface 219 has a third radius of curvature 219R. In addition, the bias member 114 is trapped between the nut 68 and the rear pivot link 32 in FIG. 12 in contrast to the bias member 114 being trapped between the bolt head 76 and the rear pivot link 32 in FIG. 4.

In more detail, the shoulder bolt 70 of FIG. 12 includes a generally cylindrical-shaped shaft 220 projecting from a bolt head 224 aligned with a longitudinal axis 70A of the shoulder bolt 70 and terminating at a shaft end 228. The shaft 220 comprises a first shaft portion 220A, a second shaft portion 220B, and a third shaft portion 220C. The first shaft portion 220A is generally cylindrical-shaped with an outer wall 220A-1 extending between the bolt head 224 and a first shaft portion end wall 220A'. The outer wall 220A-1 of the first shaft portion 220A has an outer diameter less than an outer diameter of the bolt head 224. Further, the curved shoulder surface 219 extends between the outer wall 220A-1 of the first shaft portion 220A and the first portion end wall 220A'. The outer diameter of the bolt head 224 is generally greater than an inner diameter of the apertures 48 in the seat cushion frame 24. This prevents the bolt head 224 from passing through the apertures 48 in the seat cushion frame 24. In addition, the first shaft portion 220A is sized and shaped such that at least a portion of the first shaft portion 200A will pass through the apertures 48 in the seat cushion frame 24.

In the compliant pivot joint 40 shown in FIG. 12, the second shaft portion 220B is generally cylindrical-shaped with an outer wall 220B-1 extending between the first shaft portion end wall 220A' and a second shaft portion end wall 220B'. Further, the outer wall 220B-1 has an outer diameter selected such that at least a portion of the second shaft portion 220B will pass through the opening 82 in the rear pivot link 32. The outer wall 220B-1 of the second shaft portion 220B has an outer diameter less than the outer diameter of the outer wall 220A-1 of the first shaft portion 220A. The first portion end wall 220A' extending between the second shaft portion 220B and the first shaft portion 220A defines a first shoulder 230.

Also shown in FIG. 12, extending from the second shaft portion end wall 220B' of the shoulder bolt 70 is the third shaft portion 220C. The third shaft portion 220C has a general cylindrical shape with an outer surface 220C-1 including an external screw thread configured to meshingly engage with an internal screw thread 234 in the nut 68. In addition, the outer surface 220C-1 has an outer diameter less than the outer diameter of the second shaft portion 220B with the end wall 220B' extending between the third shaft portion 220C and the second shaft portion 220B defining a second shoulder 238.

The rear pivot link 32 of FIG. 12 has a cup-shaped protrusion 90 with a curved portion 98 having a radius of curvature 98R selected such that the curved shoulder surface 219 of the shoulder bolt 70 interacts with the cup-shaped protrusion 90 with a desired pressure angle.

In the embodiment shown in FIG. 12, the bias member 114 is assembled on the shoulder bolt 70 between the rear pivot link 32 and the nut 68. When the nut 68 is threaded onto the shoulder bolt 70, a base surface 68' of the nut 68 abuts both the bias member 114 and the second shoulder 238 of the shoulder bolt 70. The bias member 114 shown in FIG. 12 is a spring disc stack 118 comprising two conical washers 122 stacked in series. It will be understood that other combinations of conical washers 122 and other types of bias members 114 can be included as desired for specific applications. In some embodiments, the shoulder bolt 70 is welded to the seat cushion frame 24, the seat base 28, or other frame members. In other embodiments, the cup-shaped protrusion 90 can be included as part of a frame member with the bolt head 224 being positioned adjacent to the rear pivot link 32, the curved shoulder surface 219 of the shoulder bolt 70 abutting the curved surface 98 of the cup-shaped protrusion 90, and the bias member 114 trapped between the nut 68 and the cup-shaped protrusion 90 in the frame member.

FIGS. 13-19 show alternate embodiments of compliant pivot joints 40, 42 that include a leaf spring 260 as a bias member 114. Elements in FIGS. 13-19 that are the same or similar to those used above in the embodiment shown in FIGS. 1-4 have the same reference numbers for simplicity. Only the significant differences in relation to the embodiment shown in FIGS. 1-4 are highlighted below. One substantial difference involves replacing the bias members 114 of the compliant pivot joints 40, 42 with a single leaf spring 260 extending between the compliant pivot joints 40, 42. More specifically, the spring disc stacks 118 of FIGS. 3 and 4 are replaced by the single leaf spring 260, as shown in FIG.

Figure 14:
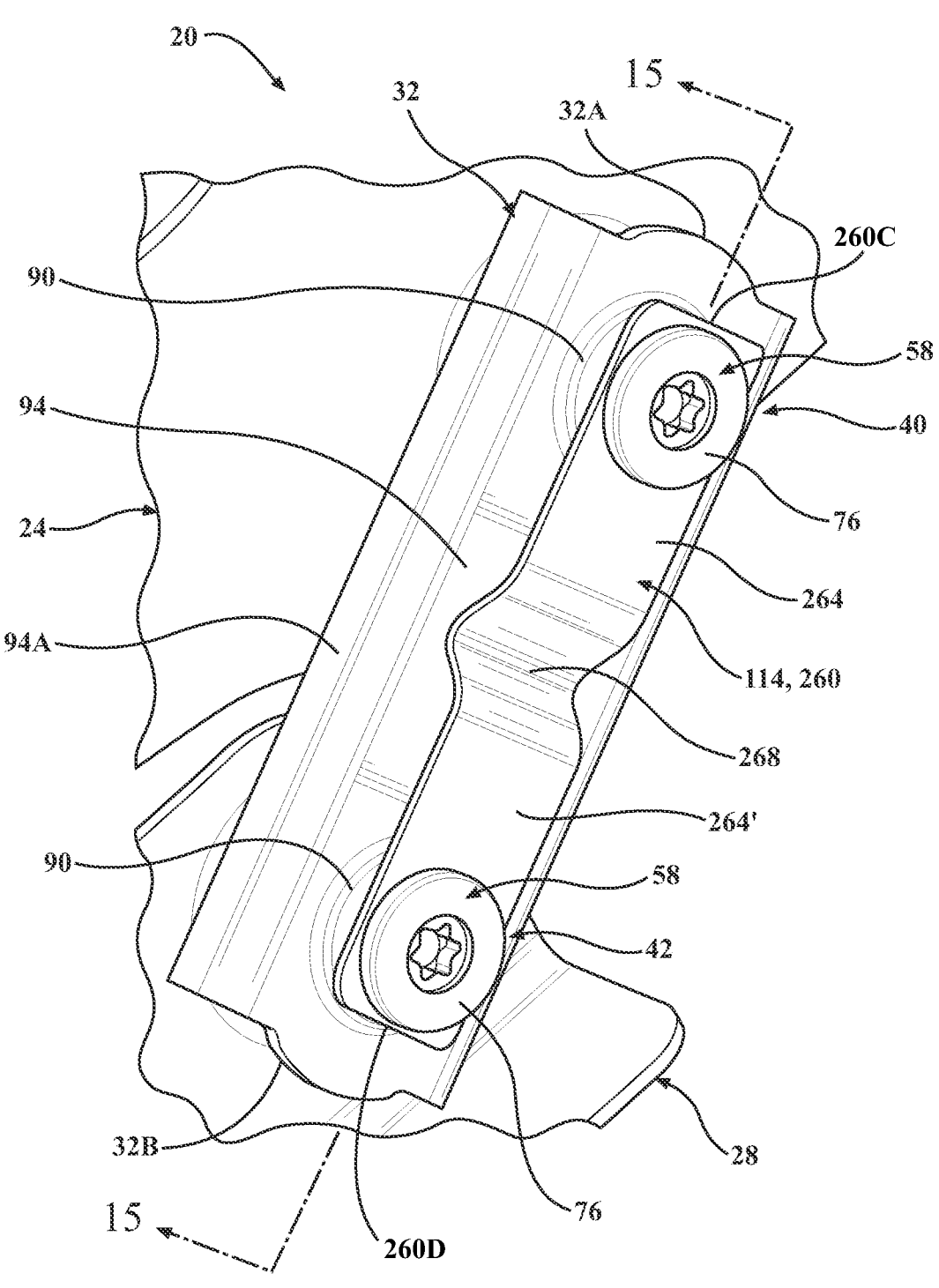
FIG. 14 is an enlarged perspective view of portion 14 of FIG. 13, showing the pivot link coupled to the seat base and to the seat cushion frame by compliant pivot joints connected by the leaf spring.
Figure 15:
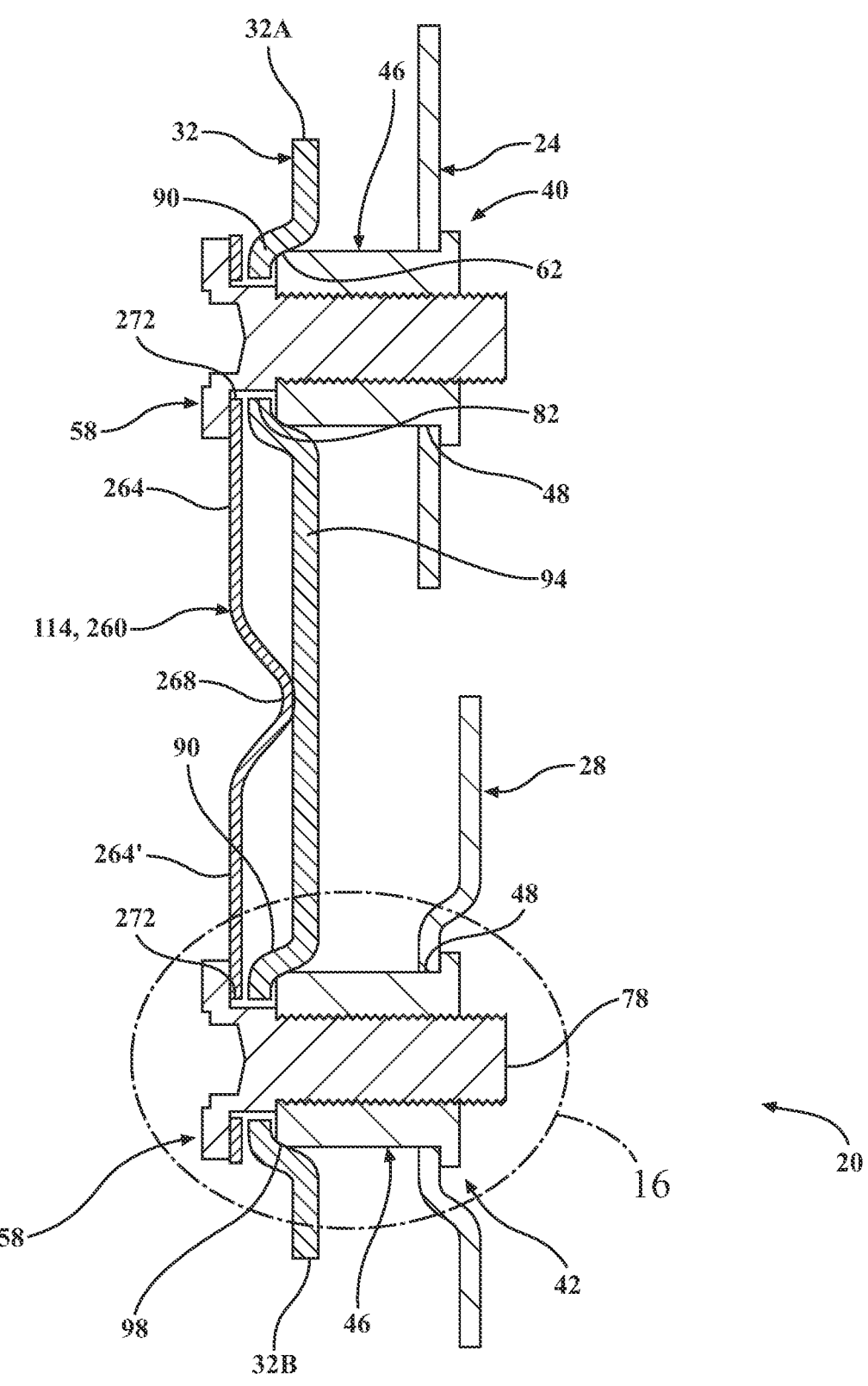
FIG. 15 is a cross-sectional view taken along section line 15-15 of FIG. 14, showing the leaf spring spanning the compliant pivot joints adjoining the pivot link to the seat cushion frame and to the seat base.
Figure 16:
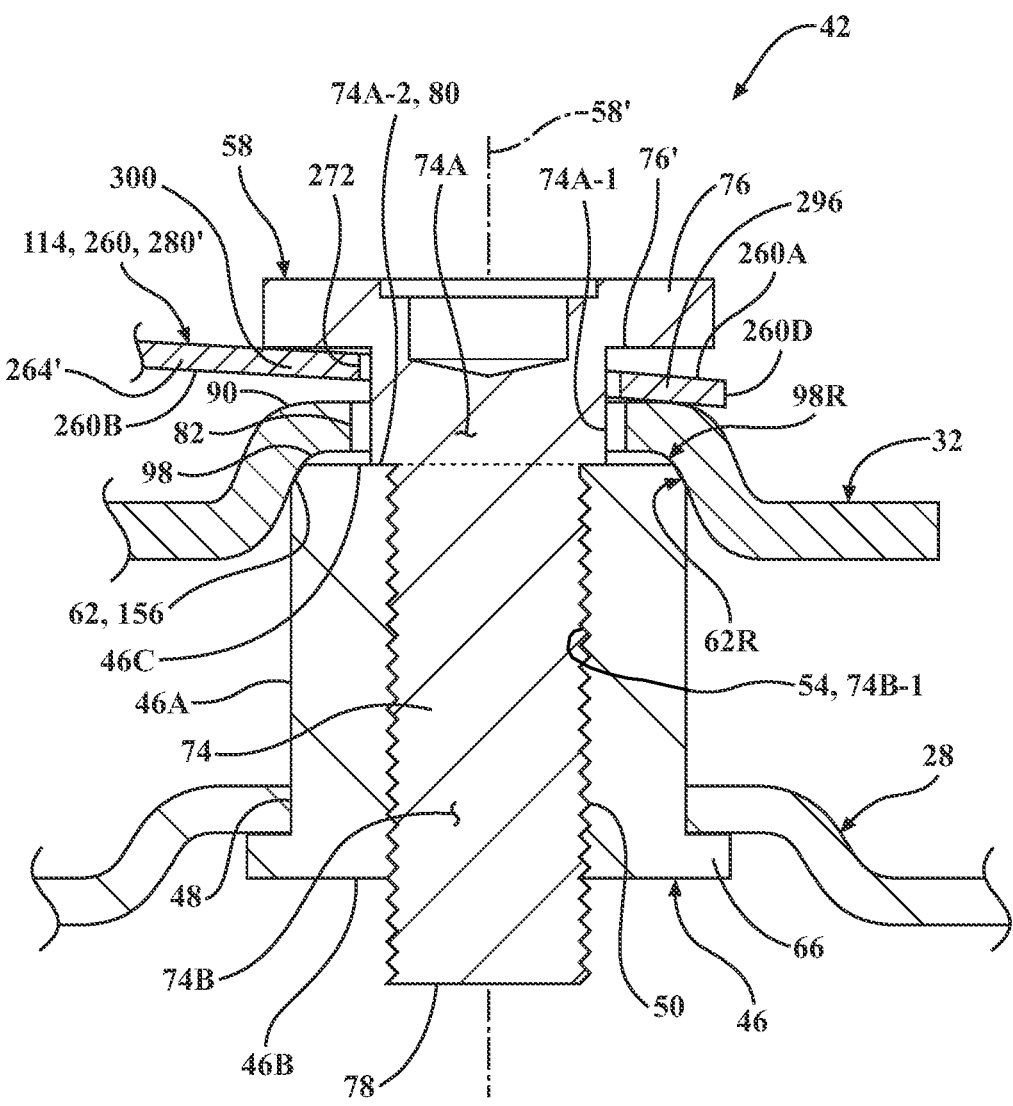
FIG. 16 is an enlarged view of portion 16 of FIG. 15, showing the leaf spring biasing the bolt head away from the pivot link.

13. The leaf spring 260 connects two compliant pivot joints 40, 42. In certain embodiments, it may be advantageous to replace two spring disc stacks 118 with a single leaf spring 260 since the number of components is reduced. FIGS. 14 and 15 show an enlarged perspective view and a cross-sectional view, respectively, of the compliant pivot joints 40, 42 of FIG. 13 rotatably coupling the rear pivot link 32 to the seat cushion frame 24 and to the seat base 28. FIG. 16 shows an enlarged view of portion 16 of FIG. 15, illustrating additional details of one of the compliant pivot joints 40, 42. In addition, FIG. 17 shows an exploded view of the compliant pivot joints 40, 42 of FIG. 14.

Referring to FIGS. 14 and 15, one exemplary embodiment of the leaf spring 260 is a stamped and/or formed bracket having a first leaf portion 264 spaced apart from a second leaf portion 264' and connected by a generally U-shaped channel 268. As shown in FIG. 15, each of the first and second leaf portions 264, 264' includes a hole 272 having an inner diameter larger than the outer diameter of the first shaft portion 74A of the shoulder bolt 58.

In the embodiments shown in FIGS. 13-19, the leaf spring 260 is formed from full hard tempered stainless steel sheet (SS301) having a thickness of about 1.5 mm between opposing upper and lower surfaces 260A, 260B, a width of about 25 mm, and an overall length of about 115 mm between opposing ends 260C, 260D of the leaf spring 260. Another embodiment of the leaf spring 260 is formed from alloy steel AISI 5160 heat treated and tempered to HRC 55-65. It will be appreciated that the leaf spring 260 can be formed of other metals, including but not limited to steel, spring steel, stainless steel, alloy steel, heat treated steel, and tempered steel.

Figure 17:
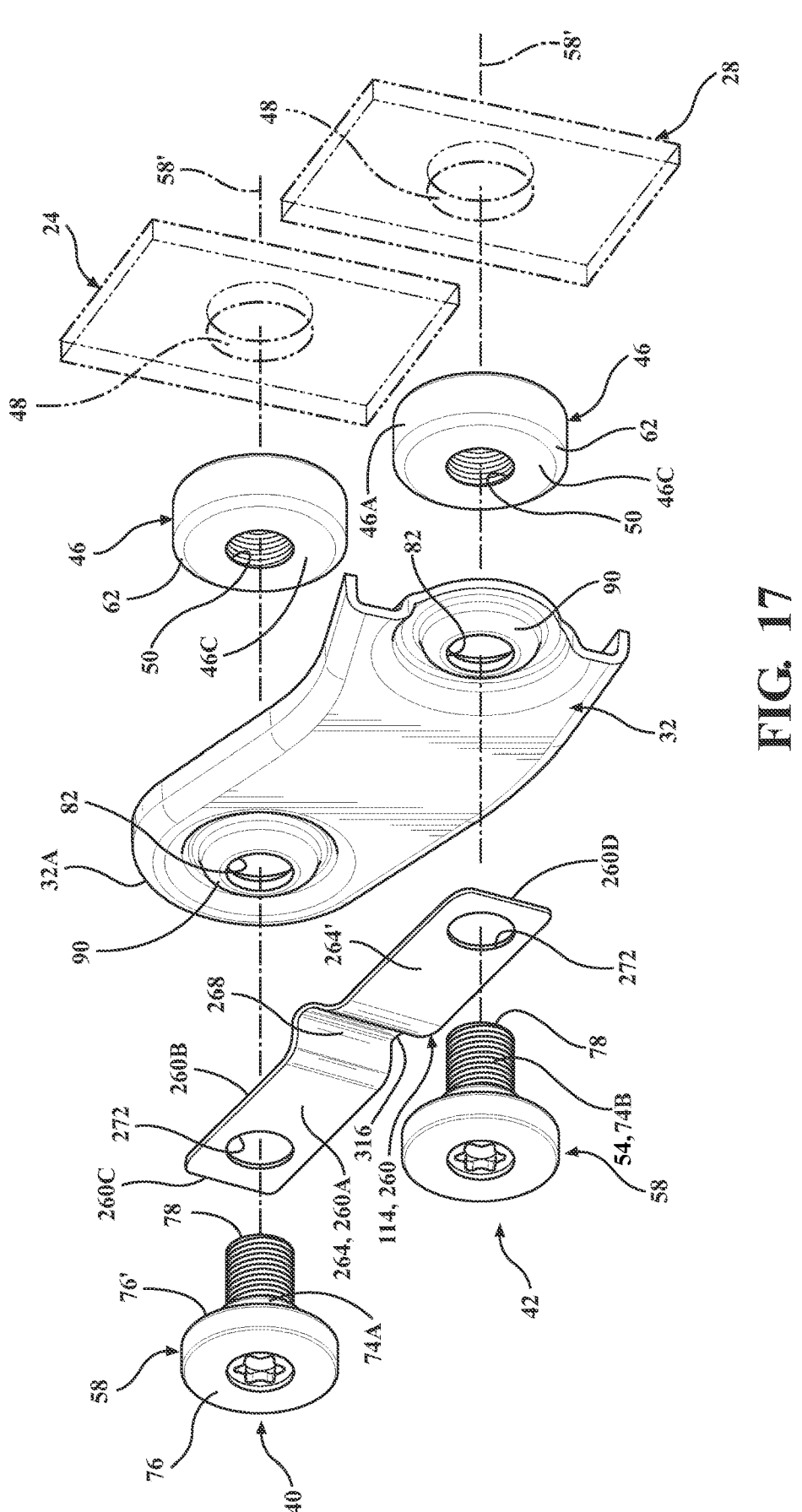
FIG. 17 is exploded view of compliant pivot joints adjoining a pivot link to a seat base and to a seat cushion frame, according to a fifth embodiment of the present invention.

Assembly of the compliant pivot joints 40, 42 connected by the leaf spring 260 is illustrated in FIG. 17. Referring to FIG. 17, the compliant pivot joints 40, 42 are assembled by attaching the clinch nuts 46 to an associated aperture 48 in the seat cushion frame 24 and the seat base 28, respectively. The shaft end 78 of each shoulder bolt 58 is passed through a respective hole 272 in the leaf spring 260, passed through the respective opening 82 in the rear pivot link 32, and fastened to the respective clinch nut 46. Optionally, grease 156 (shown in FIG. 18) is applied to the interfaces between the cup-shaped protrusions 90 of the rear pivot link 32 and the curved shoulder surfaces 62 of the clinch nuts 46. The addition of grease 156 to the interfaces between the cup-shaped protrusions 90 and the clinch nuts 46 reduces friction in the compliant pivot joints 40, 42.

Figure 18:
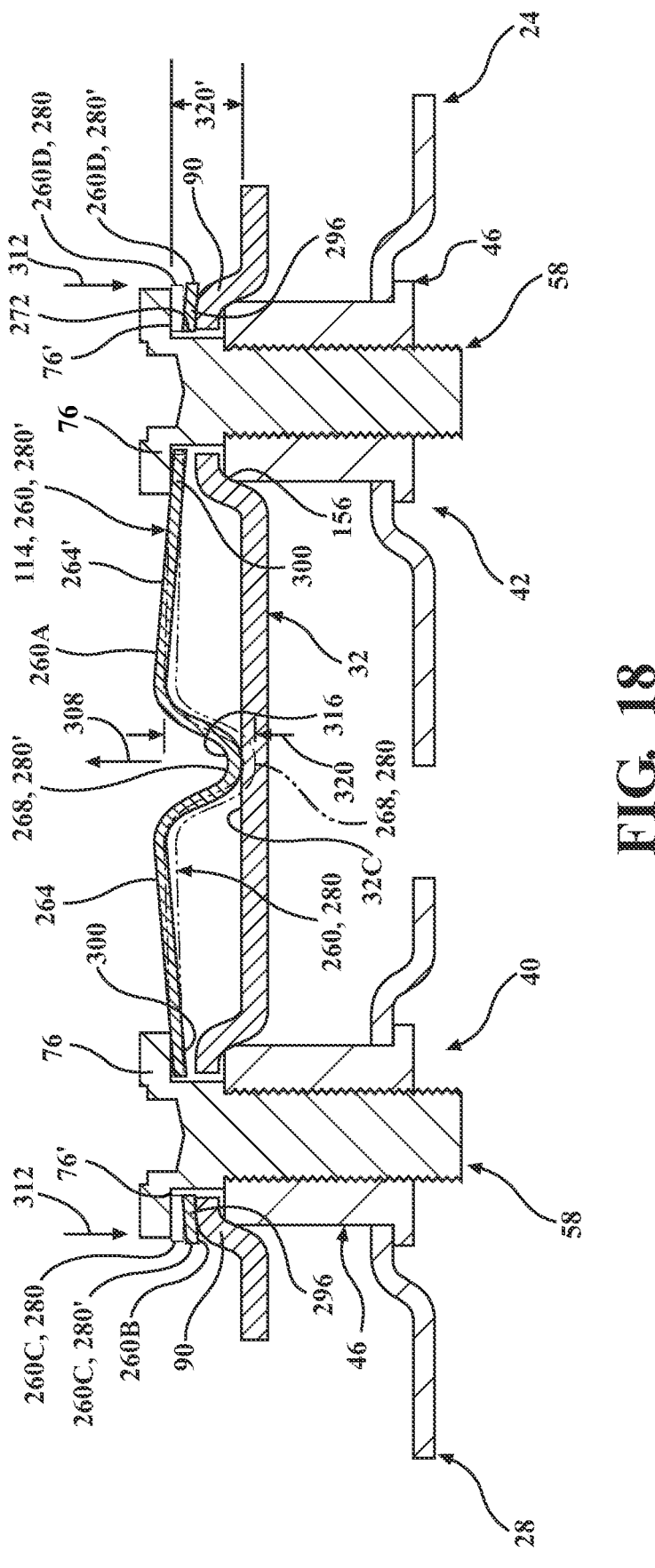
FIG. 18 is a cross-sectional view of the compliant pivot joints and the leaf spring of FIG. 14 taken along section line 15-15 of FIG. 14, showing an unconstrained profile and a constrained profile of the leaf spring.

FIG. 18 shows an unconstrained profile 280 of the leaf spring 260 and a constrained profile 280' of same leaf spring 260 constrained between the bolt heads 76 of the shoulder bolts 58 and the rear pivot link 32. An enlarged view of the leaf spring 260 constrained between the lower surface 76' of the bolt head 76 and the rear pivot link 32 is shown in FIG. 16. When the leaf spring 260 is constrained during assembly, as shown by the constrained profile 280' in FIG. 18, end portions 296 of the leaf spring 260, between each of the holes 272 and the adjacent leaf spring ends 260C, 260D, move toward the associated cup-shaped protrusions 90. The end portions 296 of the leaf spring 260 can be brought into and out of frictional engagement with the associated cup-shaped protrusions 90 based in part on tolerance stackup, dimensional variation, specific dimensions of individual components, the amount of fore-aft and lateral loads 144', 148' applied to the compliant pivot joints 40, 42, and the like as non-limiting examples.

In addition, as the leaf spring 260 of FIG. 18 is repositioned towards the constrained profile 280' from the unconstrained profile 280, a second portion 300 adjacent each of the holes 272 in the leaf spring 260 will be repositioned towards the associated bolt head 76, as shown in FIG. 18. The second portions 300 of the leaf spring 260 can be brought into and out of frictional engagement with the associated bolt head 76 based in part on tolerance stackup, dimensional variation, specific dimensions of individual components, the amount of fore-aft and lateral loads 144', 148' applied to the compliant pivot joints 40, 42, and the like as non-limiting examples.

The leaf spring 260 has an unconstrained profile 280 sized and shaped such that the U-shaped channel 268 will interfere with the rear pivot link 32 during assembly, as illustrated in FIG. 18. As the shoulder bolts 58 are fastened with the clinch nuts 46 and the U-shaped channel 268 comes in contact with the rear pivot link 32, the U-shaped channel 268 is pressed upward (arrow 308) towards the constrained profile 280'. Further, the upward movement 308 of the U-shaped channel 268 causes the opposing ends 260C, 260D of the leaf spring 260 to move downward, as illustrated by arrow 312 shown in FIG. 18. The upward movement 308 of the U-shaped channel 268 during assembly induces bias forces B1, B2 into the leaf spring 260, as illustrated in FIG. 19.

In the embodiment shown in FIG. 18, the U-shaped channel 268 of the leaf spring 260 has a valley 316 that is offset 320 from an upper surface 260A of the first and second leaf portions 264, 264' by about 9.5 mm when the first and second leaf portions 264, 264' are unconstrained and resting on a flat surface. It will be understood that actual dimensions and selected material of the leaf spring 260 will vary based on an intended application. There is also a second offset distance 320' between a contact surface 32C on the rear pivot link 32 and the lower surface 76' of bolt heads 76. The offset distance 320 between the valley 316 of the U-shaped channel 268 and the unconstrained first and second leaf portions 264, 264' is larger in comparison to the second offset distance 320'. Referring to FIGS. 18 and 19, increasing the offset distance 320 of the leaf spring 260 in comparison to the second offset distance 320' between the contact surface 32C and the lower surface 76' of the bolt heads 76 will increase the amount of bias forces B1 applied by the leaf spring 260 to the bolt heads 76. Likewise, reducing the offset distance 320 of the leaf spring 260 in comparison to the second offset distance 320' between the contact surface 32C and the lower surface 76' of the bolt heads 76 will decrease the amount of bias forces B1 applied by the leaf spring 260 to the bolt heads 76.

Figure 19:
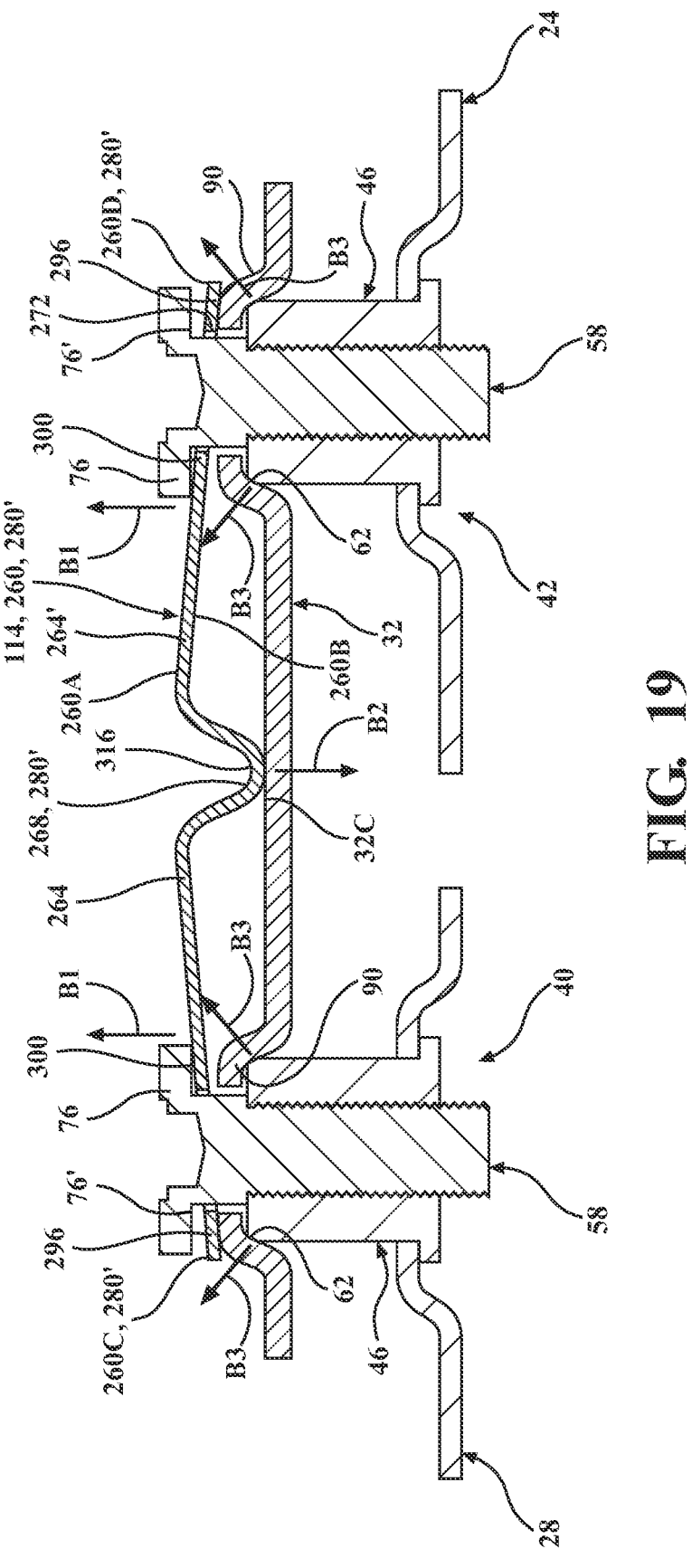
FIG. 19 illustrates a cross-sectional view of the compliant pivot joints and the leaf spring of FIG. 18, showing spring loads generated by deforming the leaf spring during assembly.

The bias forces B1 applied to the bolt heads 76 by the leaf spring 260 is counterbalanced by the bias force B2 applied to the rear pivot link 32 by the leaf spring 260, as shown in FIG. 19. Fore-aft and/or lateral loads 144', 148' applied to the compliant pivot joints 40, 42 are counterbalanced by the bias forces B1, B2 applied by the leaf spring 260 to the bolt heads 76 and the rear pivot link 32 as well as the load B3 absorbed by the interface between the curved shoulder surfaces 62 of the clinch nuts 46 and the cup-shaped protrusions 90 of the rear pivot link 32. The amount of bias forces B1 applied to the bolt heads 76 by the leaf spring 260 is affected by the amount of displacement of the U-shaped channel 268 by engagement with a contact surface 32C of the rear pivot link 32 during assembly. More specifically, the bias forces B1, B2 applied by the leaf spring 260 are the spring loads generated by deforming the leaf spring 260 during assembly. Thus, the amount of bias forces B1 applied to the bolt heads 76 by the leaf spring 260 can be increased and/or decreased by adjusting the relative amount of offset distances 320, 320'.

One benefit of the compliant pivot joint for a vehicle seat is the compliant pivot joint limits the perceived looseness in the compliant pivot joint in response to applied fore-aft and lateral loads. A second benefit is the bias member within the compliant pivot joint allows for the compliant pivot joint to have sufficient lateral clearance within the compliant pivot joint to maintain rotational friction within a target range. A third benefit is the compliant pivot joint has a low amount of chuck in response to applied fore-aft and lateral loads. Finally, the compliant pivot joint has a reduced potential for the occurrence of buzz, squeak, and rattle noises in comparison to a typical bushing pivot joint.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A compliant pivot joint for a vehicle seat, comprising:
a link member;
a frame member;
a cup opening passing between opposing upper and lower surfaces of a cup-shaped protrusion formed on one of said link member and said frame member;
a fastener having an outer surface extending between opposing upper and lower end surfaces, a curved shoulder surface extending between said upper end surface and said outer surface, and wherein said lower end surface of said fastener is fixedly coupled to the other one of said link member and said frame member;
a shoulder bolt having a shaft projecting axially from a bolt head and terminating at a shaft end, said shaft including a first shaft portion projecting from said bolt head and terminating at a first end wall adjoining a second shaft portion, said first end wall defining a shoulder; and
a bias member having a bias opening;
wherein said shaft of said shoulder bolt extends through said bias opening and through said cup opening with said shoulder bolt fixedly coupled to said fastener;
wherein said bias member is spaced between said upper surface of said cup-shaped protrusion and said bolt head of said shoulder bolt and biases said bolt head away from said cup-shaped protrusion; and
wherein said curved shoulder surface of said fastener is frictionally engaged with said lower surface of said cup-shaped protrusion and said shoulder of said shoulder bolt is frictionally engaged with said upper end surface of said fastener.

2. The compliant pivot joint of claim 1, wherein:
said bias member comprises two or more conical washers stacked in series.

3. The compliant pivot joint of claim 1, wherein:
said bias member comprises a plurality of conical washers stacked in series, in parallel, and/or in a combination of series and parallel.

4. The compliant pivot joint of claim 2, comprising:
said fastener is a nut having a threaded passageway; and
said shoulder bolt includes a threaded shaft portion configured to meshingly engage with said threaded passageway in said nut.

5. The compliant pivot joint of claim 4, wherein:

at least a portion of one or more of said curved shoulder surface and said lower surface of said cup-shaped protrusion is coated with grease.

6. The compliant pivot joint of claim 5, wherein:

said first shaft portion having a first outer diameter; and said second shaft portion having a second outer diameter less than said first outer diameter.

7. A compliant pivot link assembly for a vehicle seat, comprising:

a pivot link having first and second cup-shaped protrusions, each of said first and second cup-shaped protrusions having opposing upper and lower surfaces with a cup opening extending between said opposing upper and lower surfaces;

first and second fasteners, each of said first and second fasteners having opposing top and bottom surfaces and a curved shoulder surface extending from said top surface;

first and second shoulder bolts, each of said first and second shoulder bolts having a bolt head, an upper shaft portion projecting axially from said bolt head and terminating at a shoulder, and a lower shaft portion projecting axially from said shoulder; and first and second bias members, each of said first and second bias members having a bias opening extending axially therethrough;

wherein each of said first and second shoulder bolts extends through said bias opening in a respective one of said first and second bias members, extends through said cup opening in a respective one of said first and second cup-shaped protrusions, and is fixedly coupled to a respective one of said first and second fasteners with said shoulder frictionally engaged with said top surface of said respective one of said first and second fasteners;

wherein each of said first and second bias members are spaced between said upper surface of said respective one of said first and second cup-shaped protrusions and said bolt head of said respective one of said first and second shoulder bolts; and wherein said curved shoulder surface of each of said first and second fasteners is frictionally engaged with said lower surface of said respective one of said first and second cup-shaped protrusions.

8. The compliant pivot link assembly of claim 7, wherein:

each of said first and second bias members comprise two or more conical washers stacked in series, parallel, and/or combinations of series and parallel.

9. The compliant pivot link assembly of claim 8, wherein:

said first and second bias members comprise the same number of conical washers.

10. The compliant pivot link assembly of claim 8, wherein:

said first and second bias members comprise different numbers of conical washers.

11. The compliant pivot link assembly of claim 7, wherein:

said first and second bias members are first and second leaf portions, respectively, of a single leaf spring, wherein each of said bias openings extends through said respective one of said first and second leaf portions.

12. The compliant pivot link assembly of claim 11, wherein:

said first and second leaf portions are spaced apart by a U-shaped channel; and said U-shaped channel frictionally engages with said pivot link.

13. The compliant pivot link assembly of claim 7, wherein:

a first frame component is fixedly coupled to said bottom surface of said first fastener; and a second component is fixedly coupled to said bottom surface of said second fastener, said second component being a second frame component or a link component.

14. A compliant pivot joint for a vehicle seat, comprising:

a link member;

a frame member;

a cup opening passing between opposing upper and lower surfaces of a cup-shaped protrusion formed on one of said link member and said frame member;

a hole formed in the other one of said link member and said frame member;

a fastener having an outer surface extending between opposing upper and lower end surfaces and a threaded passageway extending between said opposing upper and lower end surfaces;

a bias member having a bias opening extending axially therethrough; and a shoulder bolt having a shaft projecting axially from a bolt head and terminating at a shaft end, said shaft including a first shaft portion, a second shaft portion, and a third shaft portion, said first shaft portion having a first outer wall projecting from said bolt head and terminating at a first end wall and having a curved shoulder surface extending between said first outer wall and said first end wall, said second shaft portion projecting axially from said first end wall and terminating at a second end wall, said second end wall defining a second shoulder, and said third shaft portion projecting axially from said second end wall, at least a portion of said third shaft portion including an external screw thread configured to meshingly engage with said threaded passageway of said fastener, wherein said bolt head is configured such that said bolt head has an outer diameter larger than an inner diameter of said hole, said first shaft portion has an outer diameter smaller than said inner diameter of said hole and larger than an inner diameter of said cup opening, said second and third shaft portions have outer diameters smaller than said inner diameters of said hole, said cup opening, and said bias opening;

wherein said shaft of said shoulder bolt extends through said hole, said cup opening, and said bias opening with said curved shoulder surface frictionally engaged with said lower surface of said cup-shaped protrusion;

wherein said threaded passageway of said fastener is meshingly engaged with said external screw thread of said third shaft portion with said lower end surface of said fastener frictionally engaged with said second shoulder of said shoulder bolt; and wherein said bias member is spaced between said lower end surface of said fastener and said upper surface of said cup-shaped protrusion and biases said fastener away from said cup-shaped protrusion.

15. The compliant pivot joint of claim 14, wherein:

said bias member comprises a plurality of conical washers stacked in series, in parallel, and/or in a combination of series and parallel.

16. The compliant pivot joint of claim 14, wherein:

a second compliant pivot joint rotationally coupling said link member to a second component.

17. The compliant pivot joint of claim 16, wherein:
said cup-shaped protrusions are formed in said link member;
said bias members are leaf portions of a single leaf spring; and
said leaf spring including a U-shaped channel coupling said leaf portions, said U-shaped channel frictionally engaged with said link member.

\* \* \* \* \*